US011870656B2

(12) United States Patent
Li

(10) Patent No.: US 11,870,656 B2
(45) Date of Patent: Jan. 9, 2024

(54) NETWORK DATA ANALYTICS METHOD AND APPARATUS

(71) Applicant: HUAWEI TECHNOLOGIES CO., LTD., Guangdong (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 17/520,732

(22) Filed: Nov. 8, 2021

(65) Prior Publication Data

US 2022/0060388 A1 Feb. 24, 2022

Related U.S. Application Data

(63) Continuation of application No. PCT/CN2020/087590, filed on Apr. 28, 2020.

(30) Foreign Application Priority Data

May 6, 2019 (CN) .......................... 201910373252.1

(51) Int. Cl.
*H04L 41/142* (2022.01)
*H04L 41/0816* (2022.01)
*H04L 41/085* (2022.01)
*H04L 41/0866* (2022.01)
*H04L 41/147* (2022.01)
*H04L 47/762* (2022.01)

(52) U.S. Cl.
CPC ......... *H04L 41/142* (2013.01); *H04L 41/085* (2013.01); *H04L 41/0816* (2013.01); *H04L 41/0866* (2013.01); *H04L 41/147* (2013.01); *H04L 47/762* (2013.01)

(58) Field of Classification Search
None
See application file for complete search history.

(56) References Cited

U.S. PATENT DOCUMENTS

| | | | | |
|---|---|---|---|---|
| 2013/0182700 | A1* | 7/2013 | Figura | H04L 41/5009 709/224 |
| 2017/0332282 | A1 | 11/2017 | Dao | |
| 2018/0262924 | A1 | 9/2018 | Dao et al. | |

FOREIGN PATENT DOCUMENTS

| | | |
|---|---|---|
| CN | 109379206 A | 2/2019 |
| CN | 109600759 A | 4/2019 |
| CN | 109600761 A | 4/2019 |
| EP | 3013002 A1 | 4/2016 |

(Continued)

OTHER PUBLICATIONS

3GPP TS 29.520 V15.0.0 (Jun. 2018)3rd Generation Partnership Project;Technical Specification Group Core Network and Terminals;5G System; Network Data Analytics Services;Stage 3(Release 15),total 32 pages.

(Continued)

*Primary Examiner* — Angela Nguyen
(74) *Attorney, Agent, or Firm* — Paul Hashim

(57) ABSTRACT

A network data analytics method and apparatus are provided. The method includes receiving, by a network repository function network element, a first message from a first device, where the first message is used to discover a network data analytics function network element, and the first message carries a first analytics identifier and first analytics filtering information.

16 Claims, 10 Drawing Sheets

(56) References Cited

FOREIGN PATENT DOCUMENTS

| WO | 2017189527 A1 | 11/2017 |
|---|---|---|
| WO | 2018161850 A1 | 9/2018 |
| WO | 2019032968 A1 | 2/2019 |

OTHER PUBLICATIONS

Samsung,"Editorial corrections to functional description and contents of analytics exposure",3GPP SA WG2 Meeting #132 S2-1903844, Apr. 8-12, 2019, Xi 'an, China, Total 2 Pages.
Nokia et al.,"Miscellaneous corrections to TS 23.288",SA WG2 Meeting #132 S2-1903997, Apr. 8-12, 2019, Xian, China,Total 12 Pages.
Ericsson,"Removing Editors note on how to register analytic metadata in NRF",SA WG2 Meeting #S2-129 S2-1811073, Oct. 15-19, 2018, total 8 pages.
S2-1900947, LG Electronics, TS 23.288 Analytics Exposure to AFs, 3GPP TSG-SA WG2 Meeting #130, Jan. 21-25, 2019, Kochi, India, 3 pages.
Huawei et al.,"Interaction between PCF and NWDAF",SA WG2 Meeting #124 S2-179206, Nov. 27, 2017-Dec. 1, 2017, Reno, Nevada,Total 2 Pages.
3GPP TR 23.791 V0.1.0 (Jan. 2018);3rd Generation Partnership Project;Technical Specification Group Services and System Aspects;Study of Enablers for Network Automation for 5G(Release 16),Total 9 Pages.
Emmanouil Pateromichelakis et al.,"End-to-End Data Analytics Framework for 5G Architecture",Special Section on Roadmap to 5G: Rising to the Challenge,vol. 7, 2019,Total 18 Pages.
3GPP TS 23.288 V0.4.0 (Apr. 2019), 3rd Generation Partnership Project; Technical Specification Group Services and System Aspects; Architecture enhancements for 5G System (5GS) to support network data analytics services(Release 16), 48 pages.
3GPP TR 23.791 V16.1.0 (Mar. 2019);3rd Generation Partnership Project;Technical Specification Group Services and System Aspects;Study of Enablers for Network Automation for 5G(Release 16),total 124 pages.
Ericsson NWDAF deployment options,SA WG2 Meeting #131 S2-1902553,Feb. 25-Mar. 1, 2019, Santa Cruz, Tenerife, Spain,total 2 pages.
3GPP TS 23.501 V16.0.2 (Apr. 2019);3rd Generation Partnership Project;Technical Specification Group Services and System Aspects;System Architecture for the 5G System;Stage 2(Release 16);total 317 pages.
3GPP TS 23.502 V16.0.2 (Apr. 2019);3rd Generation Partnership Project;Technical Specification Group Services and System Aspects;Procedures for the 5G System;Stage 2(Release 16);total 419 pages.

* cited by examiner

NETWORK DATA ANALYTICS METHOD AND APPARATUS

CROSS-REFERENCE TO RELATED APPLICATIONS

This application is a continuation of International Application No. PCT/CN2020/087590, filed on Apr. 28, 2020, which claims priority to Chinese Patent Application No. 201910373252.1, filed on May 6, 2019. The disclosures of the aforementioned applications are hereby incorporated by reference in their entireties.

TECHNICAL FIELD

This application relates to the field of communications technologies, and in particular, to a network data analytics method and apparatus.

BACKGROUND

Currently, a network data analytics function (network data analytics function, NWDAF) is introduced into the 3rd generation partnership project (3rd generation partnership project, 3GPP). The NWDAF is a network data analytics function in a 5G network defined in the 3GPP SA 2. The NWDAF may collect data from network functions (network function, NF), application functions (application function, AF), and operation administration and maintenance (operation administration and maintenance, OAM) systems, and performs analytics and prediction.

According to the 3GPP TS 23.288 specifications, a single instance or a plurality of instances of the NWDAF may be deployed in a public land mobile network (public land mobile network, PLMN). When there are a plurality of NWDAFs, not all NWDAFs need to be able to provide a same type of analytics results, that is, some NWDAF instances can provide specific types of analytics. When a plurality of NWDAF instances are deployed in the network, how a consumer of a network data analytics service finds a suitable NWDAF and requests a required data analytics result from the NWDAF is a problem to be resolved.

SUMMARY

This application provides a network data analytics method and apparatus, to resolve a problem of how a consumer of a network data analytics service finds a suitable NWDAF and requests a required data analytics result from the NWDAF when a plurality of NWDAF instances are deployed in a network.

According to a first aspect, an embodiment of this application provides a network data analytics method. The method includes: A network repository function network element receives a first message sent by a first device, where the first message is used to request to discover a network data analytics function network element, and the first message carries a first analytics identifier and first analytics filtering information. The network repository function network element determines a first network data analytics function network element based on the first analytics identifier and the first analytics filtering information, where the first data analytics function network element can provide an analytics service corresponding to the first analytics identifier, and an analytics service range of the first data analytics function network element meets the first analytics filtering information. The network repository function network element sends a second message to the first device, where the second message carries a service access address of the first network data analytics function network element.

In this embodiment of this application, an NWDAF that meets a requirement of the first message is determined by matching the analytics filtering information requested by the first message and an analytics service range supported by each NWDAF. This ensures that an NWDAF instance selected through a service discovery process can support data collection and analytics services in a requested network range.

In a possible design, the analytics service range may include one or more of the following information: an analytics filtering parameter range, a data collection range, and a data analytics range. In the foregoing design, a network data analytics function network element that meets the analytics service requested by the first device may be better selected by refining the analytics service range.

In a possible design, that the network repository function network element determines a first network data analytics function network element based on the first analytics identifier and the first analytics filtering information includes: The network repository function network element obtains registration information of a plurality of network data analytics function network elements, where the registration information includes one or more analytics identifiers, and an analytics service range of the network data analytics function network element, the network data analytics function network element can provide an analytics service corresponding to the one or more analytics identifiers; the network repository function network element determines the first network data analytics function network element in the plurality of network data analytics function network elements based on the first analytics identifier, the first analytics filtering information, and registration information of the plurality of network data analytics function network elements, where one or more analytics identifiers in registration information of the first network data analytics function network element include the first analytics identifier, and the analytics service range in the registration information of the first network data analytics function network element includes the first analytics filtering information.

In the foregoing design, the network repository function network element matches the first analytics filtering information in registration information of each network data analytics function network element, to ensure that a selected first NWDAF instance can support data collection and analytics services in the requested network range.

In a possible design, that the network repository function network element obtains registration information of a plurality of network data analytics function network elements may include: For any network data analytics function network element in the plurality of network data analytics function network elements, the network repository function network element receives a registration request message sent by the network data analytics function network element, where the registration request message includes the registration information; the network repository function network element records the registration information of the network data analytics function network element. In the foregoing design, the network repository function network element may obtain registration information of each network data analytics function network element by using a registration process of the network data analytics function network element.

According to a second aspect, an embodiment of this application provides a network data analytics method. The method includes: A network data analytics function network element sends registration information of a network data analytics function network element to a network repository function network element, where the registration information includes one or more analytics identifiers, and an analytics service range of the network data analytics function network element; the network data analytics function network element can provide an analytics service corresponding to the one or more analytics identifiers; and the network data analytics function network element receives a registration response message sent by the network repository function network element. In this embodiment of this application, the network repository function network element may obtain registration information of each network data analytics function network element by using a registration process of the network data analytics function network element, so that when a plurality of NWDAF instances are deployed in a network, the network repository function network element may determine, based on registration information of each network data analytics function network element, a network data analytics function network element that meets an analytics service requested by a first device.

In a possible design, the analytics service range includes one or more of the following information: an analytics filtering parameter range, a data collection range, and a data analytics range. In the foregoing design, the network data analytics function network element that meets the analytics service requested by the first device may be better selected by refining the analytics service range.

In a possible design, the registration request message carries configuration information of the network data analytics function network element, and the configuration information includes the analytics service range. In the foregoing design, the network repository function network element may be notified of the analytics service range of the network data analytics function network element by using the configuration information of the network data analytics function network element.

According to a third aspect, an embodiment of this application provides a network data analytics method. The method includes: A first network data analytics function network element receives a third message sent by a first device, where the third message is used to request an analytics service, and the third message carries first analytics filtering information; the first network data analytics function network element determines whether an analytics service range of the first network data analytics function network element can meet the first analytics filtering information; and when the first network data analytics function network element cannot meet the first analytics filtering information, the first network data analytics function network element allocates an analytics task to another network data analytics function network element.

In this embodiment of this application, the first network data analytics function network element supports a network repository function network element to query an analytics service range supported by another network data analytics function network element instance. In addition, the first network data analytics function network element supports allocating an analytics task to another network data analytics function network element based on an analytics service range requested by the first device and an analytics service range supported by another network data analytics function network element. This ensures that the network data analytics function network element can support data collection and analytics services in a requested network range. This reduces data transmission, improves analytics efficiency, and shortens analytics response time.

In a possible design, that the first network data analytics function network element allocates an analytics task to another network data analytics function network element may include: The first network data analytics function network element determines, based on the first analytics filtering information and recorded analytics service ranges of a plurality of network data analytics function network elements, whether a second network data analytics function network element that meets the first analytics filtering information exists in the plurality of network data analytics function network elements; and if the second network data analytics function network element exists, the first network data analytics function network element sends a fourth message to the second network data analytics function network element, where the fourth message is used to request an analytics service, and the third message carries an address of the first device.

In the foregoing design, the first network data analytics function network element may support to redirect an analytics service request to an appropriate network data analytics function network element based on the analytics service range requested by the first device and an analytics service range supported by another network data analytics function network element.

In a possible design, that the first network data analytics function network element allocates an analytics task to another network data analytics function network element may include: The first network data analytics function network element determines whether a network data analytics function network element that meets the first analytics filtering information exists; if no network data analytics function network element that meets the first analytics filtering information exists, the first network data analytics function network element determines, based on the first analytics filtering information and recorded analytics service ranges of a plurality of network data analytics function network elements, one or more second network data analytics function network elements in the plurality of network data analytics function network elements; for any second network data analytics function network element, the first network data analytics function network element decomposes, based on an analytics service range of the second network data analytics function network element, the analytics service requested by the first device into one subtask; and the first network data analytics function network element allocates the subtask to the second network data analytics function network element.

In the foregoing design, the first network data analytics function network element may support to decompose a data analytics task and/or a data collection task to another network data analytics function network element based on the analytics service range requested by the first device and an analytics service range supported by another network data analytics function network element. In the foregoing method, the plurality of network data analytics function network elements may collaborate to complete an analytics service by splitting the analytics task. This ensures that the network data analytics function network element can support to provide data collection and analytics services in a network range requested by the first device. This reduces data transmission, improves analytics efficiency, and shortens analytics response time.

In a possible design, that the first network data analytics function network element determines, based on the first analytics filtering information and recorded analytics service ranges of a plurality of network data analytics function network elements, one or more second network data analytics function network elements in the plurality of network data analytics function network elements includes: The first network data analytics function network element determines a data analytics range based on the first analytics filtering information; and the first network data analytics function network element determines one or more data collection subranges based on the recorded analytics service ranges of the plurality of network data analytics function network elements; and the first network data analytics function network element determines the one or more second network data analytics function network elements based on the one or more data collection subranges, where an analytics service range of one second network data analytics function network element includes one data collection subrange.

In the foregoing design, the data analytics range requested by the first device is decomposed into one or more data collection subranges, and the second network data analytics function network element that meets the analytics service requested by the first device may be determined based on the data collection subranges.

In a possible design, that the first network data analytics function network element decomposes, based on an analytics service range of the second network data analytics function network element, the analytics service requested by the first device into one subtask includes: The first network data analytics function network element decomposes, for the second network data analytics function network element, the analytics service requested by the first device into one subtask, where the subtask is a data collection task or a data analytics task in a data collection subrange included in the analytics service range of the second network data analytics function network element.

In the foregoing design, the data collection task or the data analytics task in the data collection subrange is allocated to the second network data analytics function network element, so that the plurality of network data analytics function network elements may collaborate to complete one analytics service. This ensures that the network data analytics function network element can support to provide data collection and analytics services in the network range requested by the first device. This reduces data transmission, improves analytics efficiency, and shortens analytics response time.

In a possible design, the subtask is a data collection task, and the first network data analytics function network element may further receive network data separately sent by the one or more second network data analytics function network elements. Network data sent by the any second network data analytics function network element is obtained through collection by the second network data analytics function network element for the allocated subtask. The first network data analytics function network element performs data analytics based on first data, to obtain a data analytics result, where the first data includes the network data separately sent by the one or more second network data analytics function network elements. The first network data analytics function network element sends the data analytics result to the first device.

In the foregoing design, the first network data analytics function network element allocates the data collection task to the second network data analytics function network element, so that the first network data analytics function network element can obtain network data beyond a supported data collection range. This ensures that the first network data analytics function network element can support to provide a data analytics service in the network range requested by the first device. This reduces data transmission, improves analytics efficiency, and shortens analytics response time.

In a possible design, the subtask is a data analytics task, and the first network data analytics function network element may further receive data analytics results separately sent by the one or more second network data analytics function network elements. A data analytics result sent by the any second network data analytics function network element is obtained through network data collection and data analytics by the second network data analytics function network element for the allocated subtask. The first network data analytics function network element summarizes the data analytics results separately sent by the one or more second network data analytics function network elements, to obtain a summarized data analytics result. The first network data analytics function network element sends the summarized data analytics result to the first device, or performs data analytics on the summarized data analytics result and sends a processed data analytics result to the first device.

In the foregoing design, the first network data analytics function network element allocates the data analytics task to the second network data analytics function network element, so that original network data in the data collection subrange is not collected and output outside a network domain. This meets a network data security requirement.

In a possible design, the first network data analytics function network element may further send a fifth message to a network repository function network element, where the fifth message is used to request to discover a network data analytics function network element, and the fifth message carries one or more analytics identifiers. The first network data analytics function network element receives a sixth message from the network repository function network element, where the sixth message carries addresses of the plurality of network data analytics function network elements and the corresponding analytics service ranges, and any network data analytics function network element in the plurality of network data analytics function network elements supports an analytics service corresponding to one or more analytics identifiers. The first network data analytics function network element records the analytics service ranges of the plurality of network data analytics function network elements.

In the foregoing design, the first network data analytics function network element uses a network data analytics function network element discovery process to support the network repository function network element to query an analytics service range supported by another network data analytics function network element instance.

In a possible design, the fifth message may further carry indication information, and the indication information is used to request to obtain configuration information of the network data analytics function network element. The sixth message carries configuration information of the plurality of network data analytics function network elements, and the configuration information includes the analytics service ranges. That the first network data analytics function network element records the analytics service ranges of the plurality of network data analytics function network elements includes: For any network data analytics function network element in the plurality of network data analytics function network elements, the first network data analytics function network element obtains and records an analytics service range of the network data analytics function network element by parsing configuration information of the network data analytics function network element.

In the foregoing design, the first network data analytics function network element may obtain an analytics service range of another network data analytics function network element by parsing configuration information of the another network data analytics function network element.

According to a fourth aspect, an embodiment of this application provides a network data analytics apparatus. The apparatus may be a network repository function network element, or may be a chip that can be applied to the network repository function network element. The apparatus has functions of implementing various embodiments of the first aspect. The function may be implemented by hardware, or may be implemented by hardware executing corresponding software. The hardware or the software includes one or more modules corresponding to the foregoing function.

According to a fifth aspect, an embodiment of this application provides a data analytics apparatus, including a processor and a memory. The memory is configured to store instructions. When the apparatus runs, the processor executes the instructions stored in the memory, to enable the apparatus to perform the data analytics method in any one of the first aspect or the implementation methods of the first aspect. It should be noted that the memory may be integrated into the processor, or may be disposed independent of the processor.

According to a sixth aspect, an embodiment of this application provides an apparatus. The apparatus includes a processor. The processor is configured to be coupled to a memory, read instructions in the memory, and perform, according to the instructions, the network data analytics method in any one of the first aspect or the implementation methods of the first aspect.

According to a seventh aspect, an embodiment of this application provides an apparatus. The apparatus may be a network data analytics function network element, or may be a chip applied to a network data analytics function network element. The apparatus has a function of implementing the embodiments of the second aspect, or the apparatus has a function of implementing the third aspect. The function may be implemented by hardware, or may be implemented by hardware executing corresponding software. The hardware or the software includes one or more modules corresponding to the foregoing function.

According to an eighth aspect, an embodiment of this application provides an apparatus, including a processor and a memory. The memory is configured to store instructions. When the apparatus runs, the processor executes the instructions stored in the memory, so that the apparatus is enabled to perform the network data analytics method in the second aspect or any implementation method of the second aspect, or perform the network data analytics method in the third aspect. It should be noted that the memory may be integrated into the processor, or may be disposed independent of the processor.

According to a ninth aspect, an embodiment of this application provides an apparatus, where the apparatus includes a processor. The processor is configured to be coupled to a memory, read instructions in the memory, and perform, according to the instructions, the network data analytics method in the second aspect or any implementation method of the second aspect, or perform the network data analytics method in the third aspect.

According to a tenth aspect, an embodiment of this application further provides a readable storage medium. The readable storage medium stores a program or instructions, and when the program or instructions runs or run on a computer, any network element selection method in the foregoing aspects is performed.

According to an eleventh aspect, an embodiment of this application further provides a computer program product including instructions. When the computer program product runs on a computer, the computer is enabled to perform any network element selection method in the foregoing aspects.

According to a twelfth aspect, an embodiment of this application further provides a system. The system includes a network repository function network element and a network data analytics function network element, and the network data analytics function network element may be configured to perform steps performed by the network repository function network element in the first aspect or any method in the first aspect.

In a possible design, the system may further include another device that interacts with the network repository function network element and/or the network data analytics function network element in the solution provided in this embodiment of this application, for example, a first device.

According to a thirteenth aspect, an embodiment of this application further provides a system. The system includes a network repository function network element and a network data analytics function network element, and the network data analytics function network element may be configured to perform steps performed by the network data analytics function network element in the second aspect or any method in the second aspect; or the network data analytics function network element may be configured to perform steps performed by the first network data analytics function network element in the third aspect or any method in the third aspect.

In a possible design, the system may further include another device that interacts with the network repository function network element and/or the network data analytics function network element in the solution provided in this embodiment of this application, for example, a first device.

According to a fourteenth aspect, an embodiment of this application further provides a system. The system includes a network repository function network element and a network data analytics function network element, and the network data analytics function network element may be configured to perform steps performed by the network repository function network element in the first aspect or any method in the first aspect. The network data analytics function network element may be configured to perform steps performed by the network data analytics function network element in the second aspect and any method of the second aspect, or the network data analytics function network element may be configured to perform steps performed by the first network data analytics function network element in the third aspect and any method of the third aspect.

In a possible design, the system may further include another device that interacts with the network repository function network element and/or the network data analytics function network element in the solution provided in this embodiment of this application, for example, a first device.

In addition, for technical effects brought by any design manner in the fifth aspect to the fourteenth aspect, refer to technical effects brought by different implementations in the first aspect to the fourth aspect. Details are not described herein again. These aspects or other aspects in the embodiments of this application are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings.

The embodiments of this application is applicable to a 4G (fourth generation mobile communications system) evolution system, for example, a long term evolution (long term evolution, LTE) system, or may be a 5G (fifth generation mobile communications system) system, for example, an access network in which a new radio access technology (new radio access technology, New RAT) is used, and a communications system such as a cloud radio access network (Cloud Radio Access Network, CRAN).

Figure 1A:
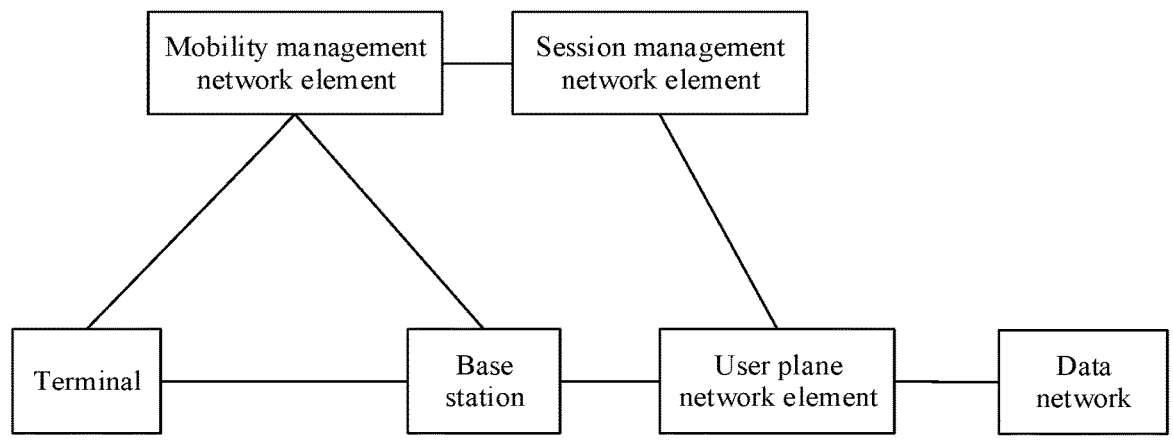
FIG. 1A to FIG. 1C are schematic diagrams of system architectures according to an embodiment of this application.

FIG. 1A is an example of a schematic diagram of a system architecture to which an embodiment of this application is applicable. It should be understood that this embodiment of this application is not limited to the system shown in FIG. 1A. In addition, an apparatus in FIG. 1A may be hardware, or may be software obtained through division by function, or a structure obtained by combining the hardware and the software. As shown in FIG. 1A, a system architecture provided in this embodiment of this application includes a terminal, a base station, a mobility management network element, a session management network element, a user plane network element, and a data network (data network, DN). The terminal communicates with the DN by using the base station and the user plane network element. The base station is connected to the mobility management network element through an N2 interface. The user plane network element is connected to the base station through an N3 interface, the user plane network element may be connected to the DN through an N6 interface, and a plurality of UPFs are connected to each other through N9 interfaces. An interface name is merely an example for description, and is not specifically limited in the embodiments of this application.

The network element shown in FIG. 1A may be a network element in a 4G architecture, or may be a network element in a 5G architecture.

A data network (data network, DN) provides a data transmission service for a user, and may be a PDN network, for example, internet (internet) or an IP multimedia service (IP Multimedia Service, IMS).

Figure 1B:
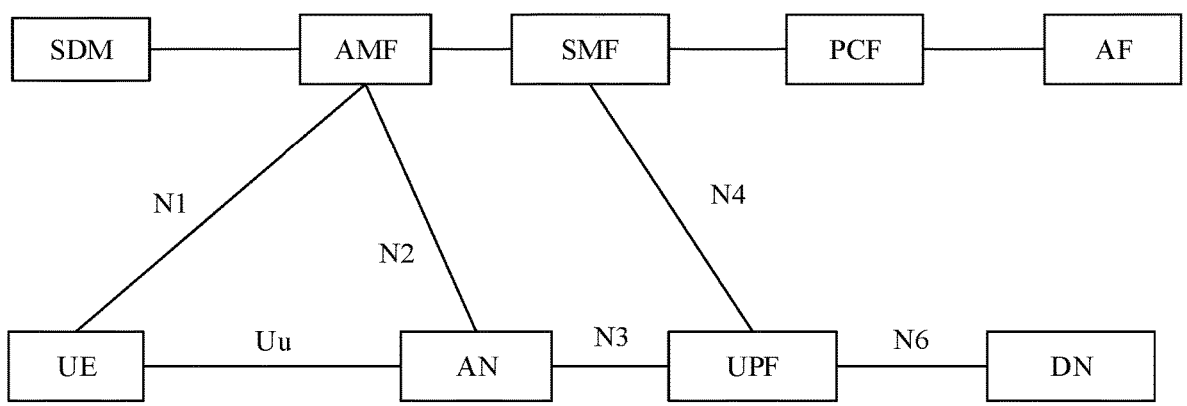
Figure 1C:
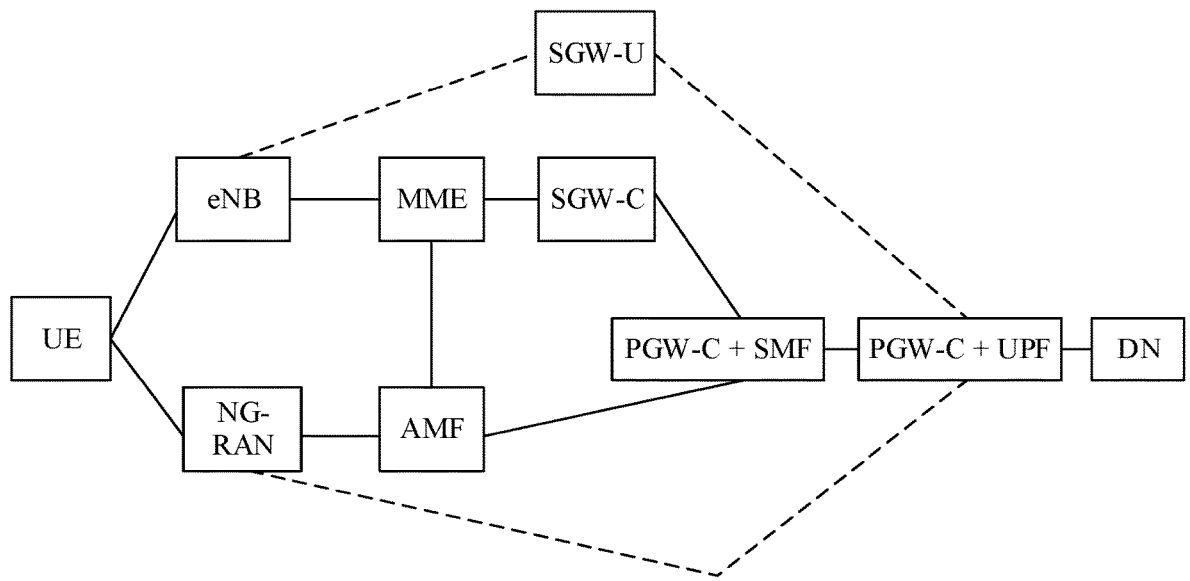

Refer to a schematic diagram of a 5G system architecture shown in FIG. 1B and a diagram of a system architecture after 4G and 5G integration shown in FIG. 1C. A mobility management network element may include an access and mobility management function (access and mobility management function, AMF) in 5G, a control plane function (SGW-C) of a serving gateway (Serving GateWay, SGW) and a mobility management entity (mobility management entity, MME) in 4G, or all or part of a control function formed after the foregoing network elements are integrated. The mobility management network element is responsible for UE access and mobility management in a mobile network. The AMF is responsible for the UE access and mobility management, NAS message routing, session management function entity (session management function, SMF) selection, and the like. The AMF may be used as an intermediate network element, and is configured to transmit a session management message between UE and the SMF. In future communication (for example, in 6G or another network), the mobility management network element may still be an AMF network element or have another name. This is not limited in this application.

A session management network element is responsible for forwarding path management, for example, delivering a packet forwarding policy to a user plane network element, and indicating the user plane network element to process and forward a packet according to the packet forwarding policy. The session management network element may be an SMF in 5G, and is responsible for session management, for example, session creation/modification/deletion, UPF selection, and allocation and management of user plane tunnel information. The session management network element may be a control plane function (SGW-C) of a serving gateway (Serving GateWay, SGW) in 4G or a control plane function (PGW-C) of a packet data network (packet data network, PDN) gateway (gateway, GW) in 4G. Alternatively, the session management function may be all or a part of a control function formed after an SMF network element and a PGW-C network element are integrated. In future communication (for example, in 6G or another network), the session management network element may still be an SMF network element or have another name. This is not limited in this application.

A user plane network element may be a user plane function entity (user plane function, UPF) in a 5G architecture, as shown in FIG. 1B or FIG. 1C. The UPF is responsible for packet processing and forwarding. The user plane network element may be a physical or virtual forwarding device such as a forwarding plane function (PGW-U) of a PGW, a forwarding plane function (SGW-U) of an SGW, a router, or a switch. In future communication (for example, in 6G or another network), the user plane network element may still be a UPF network element or have another name. This is not limited in this application.

A system architecture provided in this embodiment of this application may further include a policy control function (policy control function, PCF) entity or a policy and charging control function (policy and charging control function, PCRF) entity. The PCF or PCRF is responsible for policy control decision and flow-based charging control.

A data management network element is configured to: process a terminal device identifier, perform access authentication, registration, and mobility management, and the like. In a 5G communications system, the data management network element may be a unified data management (unified data management, UDM) network element. In a future communications system, the unified data management may still be a UDM network element, or may also have another name. This is not limited in this application. A subscriber data management entity in English may correspond to subscriber data management (SDM) or unified data management (UDM).

A network storage network element is configured to maintain real-time information of all network function services in a network. In a 5G communications system, the network storage network element may be a network registration function (network repository function, NRF) network element, or may be a network function repository function ((network function, NF) repository function, NRF). In a future communications system, the network storage network element may still be an NRF network element, or may also have another name. This is not limited in this application. The network storage network element may store information about a plurality of network elements, for example, information about an SMF, information about a UPF, and information about an AMF. Network elements such as an AMF, an SMF, and a UPF in the network may be connected to the NRF. They may register their own network element information with the NRF, and other network elements may obtain information about registered network elements from the NRF. Another network element (such as an AMF) may obtain an available network element by sending a request to the NRF based on a network element type, a data network identifier, unknown area information, and the like. If a domain name system (domain name system, DNS) server is integrated into the NRF, a corresponding selection function network element (for example, an AMF) may request, from the NRF, to obtain another to-be-selected network element (for example, an SMF).

As a specific implementation form of an access network (access network, AN), a base station may also be referred to as an access node. In a form of radio access, the base station is referred to as a radio access network (radio access network, RAN). As shown in FIG. 1B or FIG. 1C, the base station provides a radio access service for a terminal. The access node may be specifically a base station in a global system for mobile communication (global system for mobile communication, GSM) system or a code division multiple access (code division multiple access, CDMA) system, may be a base station (NodeB) in a wideband code division multiple access (wideband code division multiple access, WCDMA) system, may be an evolutional base station (evolutional node B, eNB, or eNodeB) in an LTE system, or may be a base station device, a small cell device, a wireless access node (Wi-Fi AP), a worldwide interoperability for microwave access base station (worldwide interoperability for microwave access base station, WiMAX BS), or the like in a 5G network. This is not limited in this application.

A terminal device may also be referred to as an access terminal, user equipment (user equipment, UE), a subscriber unit, a subscriber station, a mobile station, a remote station, a remote terminal, a mobile device, a user terminal, a wireless communications device, a user agent, a user apparatus, or the like. In FIG. 1B and FIG. 1C, the UE is used as an example for description. The terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, an internet of things terminal device, such as fire detection sensor, smart water meter/electricity meter, and a factory surveillance device, or the like.

In addition, the system architecture may further include a network application function (application function, AF). The AF mainly performs dynamic policy or charging control on forwarding plane behavior. These services need the dynamic policy and the charging control. The AF transmits dynamic session information required by the PCF, and receives specific information of an IP connection access network (IP-CAN) and acknowledgment of an IP-CAN bearer level event.

The foregoing functions may be network elements in a hardware device, or may be software functions running on dedicated hardware, or may be virtualization functions instantiated on a platform (such as a cloud platform).

It should be noted that "a plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In addition, it should be understood that although terms first, second, third, and the like may be used in this embodiment of this application to describe various messages, requests, and network elements, these messages, requests, devices, and core network devices should not be limited to these terms. These terms are used only to distinguish between the messages, the requests, and the terminals.

A 5th generation (5th generation, 5G) mobile communications technology proposed by a 3rd Generation Partnership Project (3rd generation partnership project, 3GPP) needs to meet differentiated service requirements of different industries on communications networks, and network are increasingly complex. 5G networks require end-to-end assurance of network performance and service experience. Network slicing deployment and adjustment can be completed in shorter time, and delivery time of new services can be shortened. Structures and topologies of the networks are increasingly complex. Once congestion or a fault occurs, fast automatic recovery is required. With application of technologies such as deep learning in big data analytics, analytics and suggestions can be output, and reasonable decisions can be made by analyzing which services are frequently used by a customer, when, where, and how long to use these services, running status data of network elements and links in a network, data related to radio resource usage and coverage, to achieve these goals. Therefore, a network data analytics function is introduced.

The network data analytics function is used to collect data from each network function (network function, NF) (for example, an AMF, an SMF, or a policy control function (policy control function, PCF), a UDM, a network exposure function (network exposure function, NEF), and the like), an application function (application function, AF), and an operation administration and maintenance (operation administration and maintenance, OAM) system, and performs analytics and prediction. In a 5G communications system, the network data analytics function may be a network data analytics function (network data analytics function, NWDAF) entity. In a future communications system, the network data analytics function may still be an NWDAF network element, or may also have another name. This is not limited in this application.

Figure 2A:
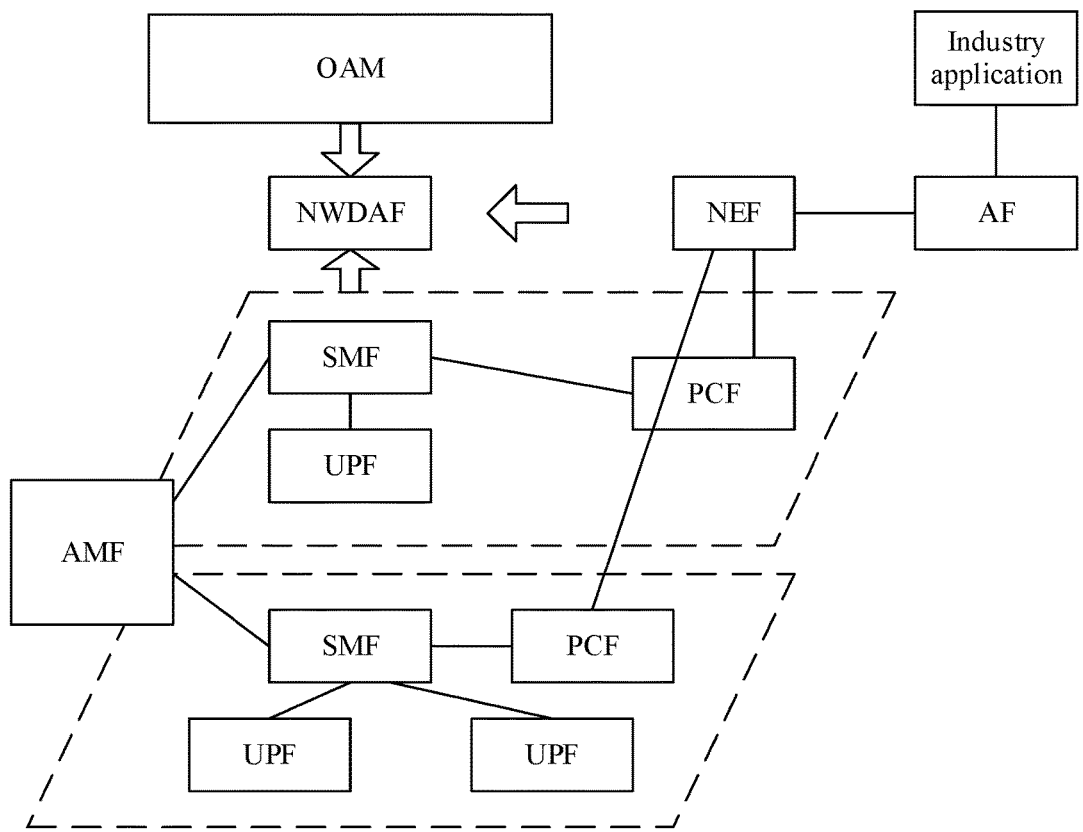
FIG. 2A is a schematic diagram of a structure of a system in a network data analytics scenario according to an embodiment of this application.

An NWDAF represents a network analytics logic function managed by an operator. According to 3GPP TS 23.288 specifications, the NWDAF provides a network data analytics function in a public land mobile network (public land mobile network, PLMN), collects data through event subscription from a 5G network function network element (for example, an AMF, an SMF, a PCF, a UDM, an NEF, and the like), an AF and an OAM (for example, a network management system (network management system, NMS)) of operators or third parties, searches information from a data repository (a unified data repository (unified data repository, UDR), an NF information repository (network repository function, NRF), and a network slice information repository (network slice selection function, NSSF)), and provides data analytics based on a requirement of a 5G network function, the AF, or the OAM. A schematic diagram of an architecture is shown in FIG. 2A below. Some network function network elements in the figure form a network slice. Network slicing logically isolates physical facilities of a network, to form a plurality of logically isolated networks. In addition, network function network elements can be differently optimized and configured in a logically isolated network, to support different types of service requirements. An NWDAF can analyze network data of a plurality of network slices and provide analytics suggestions to ensure that the network slices can meet differentiated service experience quality requirements in an end-to-end manner.

Results of network data analytics performed by the NWDAF can be used by the 5G network function, the AF, or the OAM. For example, the AMF can use a data analytics result to optimize terminal mobility management, allocate a proper registration area range to a terminal, and reduce unnecessary network registration. The SMF can use a data analytics result to select an appropriate user plane network function path for data connection established by the terminal, to avoid network congestion. The OAM can use a data analytics result to predict resource requirements for network slices, and expand resources in advance to ensure service experience. The AF can use a data analytics result to obtain network performance prediction and perform adjustment in advance. All the foregoing network functions, the AF, or the OAM that use the data analytics results may be referred to as consumers of a network data analytics service. When the consumer of the network data analytics service requests the network data analytics service, the consumer may request a plurality of analytics results triggered by a subscription event or periodically obtained, or may request a one-time analytics result. The two cases are both applicable and are not particularly distinguished in this embodiment of this application. The consumer of the network data analytics service may carry an analytics filtering parameter in the foregoing two request messages, and request the NWDAF to provide a part of the analytics result concerned by a consumer.

According to the 3GPP TS 23.288 specifications, a single instance or a plurality of instances of the NWDAF can be deployed in a PLMN. If a plurality of NWDAF instances are deployed, the NWDAF can be deployed as a central network function, as a group of distributed network functions, or as a combination thereof. When there are a plurality of NWDAFs, not all NWDAFs need to be able to provide a same type of analytics results, that is, some of NWDAF instances can provide specific types of analytics. Even some NWDAFs may be deployed together with some network function network elements (for example, the PCF, the AMF, and the SMF), that is, they are physically one network device. When the plurality of NWDAF instances are deployed in the network, how the consumer of the network data analytics service finds a suitable NWDAF and request a required data analytics result from the NWDAF is a problem to be resolved.

According to the 3GPP TS 23.288 specifications, the network data analytics service of the NWDAF supports many specific application scenarios, for example, network function load analytics, network slice load analytics, service experience-related network data analytics, network performance information analytics, terminal mobile data analytics, terminal communication data analytics, abnormal terminal behavior analytics, and user plane congestion analytics. An analytics identifier (Analytics ID) is defined for each of the foregoing application scenarios. As shown in Table 1, if an NWDAF instance supports an application scenario, a corresponding analytics ID is configured. After each NWDAF instance runs properly, a supported network data analytics service needs to be registered with the NRF. When registering with the NRF, an NWDAF instance needs to provide a list of all analytics IDs supported by the NWDAF instance in addition to providing a network function profile (NF Profile) in a same manner as other network functions.

TABLE 1

| Analytics service | Analytics ID |
|---|---|
| Network function load analytics | 1 |
| Network slice load analytics | 2 |
| Service experience-related network data analytics | 3 |
| Network performance information analytics | 4 |
| Terminal mobile data analytics | 5 |
| Terminal communication data analytics | 6 |
| Abnormal terminal behavior analytics | 7 |
| User plane congestion analytics | 8 |
| . . . | . . . |

It should be understood that Table 1 is merely an example, and does not specifically limit a type of the analytics service, an analytics ID corresponding to the analytics service, and the like.

If the consumer of the network data analytics function needs to search for an NWDAF instance and request to use a network data analytics service provided by the NWDAF instance, the consumer can query the NRF. When querying the NRF, in addition to a network function type (namely, the NWDAF), the consumer further needs to provide an application scenario of an expected network data analytics service, namely an analytics ID.

The NRF queries registration information of all NWDAF instances, finds a matching NWDAF instance, and sends a service access address to the consumer of the network data analytics function. In this way, the consumer of the network data analytics function can further interact with the NWDAF instance, and use the expected network data analytics service.

If there are a plurality of instances of the NWDAF, or even if some NWDAFs are co-deployed with other network functions, a range of data collected by these NWDAFs and a network range related to analytics results output by these NWDAFs may be limited. As a result, although the NWDAF instances can provide a type of network data analytics service, a range of its service (that is, a range of an analytics service) is limited.

It is not considered in the conventional technology that a range in which the NWDAF instance collects data (namely, a data collection range) and a range in which a service is provided (namely, a data analytics range) may be limited and data analytics may not be performed in a network range expected by the service consumer.

Further, if a service range expected by the consumer exceeds a data collection range of any NWDAF instance, the conventional technology does not propose a method in which a plurality of NWDAF instances collaborate to provide a data analytics service.

Based on this, the embodiments of this application provide a network data analytics method and apparatus, to resolve a problem of how a consumer of a network data analytics service finds a suitable NWDAF and requests a required data analytics result from the NWDAF when a plurality of NWDAF instances are deployed in a network. The method and the apparatus are conceived based on a same inventive idea. The method and the apparatus have similar principles for resolving the problem. Therefore, mutual reference may be made between implementations of the apparatus and the method. Details of repeated parts are not described.

The following specifically describes the network data analytics method. For ease of description, a network data analytics function network element is referred to as an NWDAF, and a network repository function network element is referred to as an NRF. It should be understood that this is merely an example. Naming of the network data analytics function network element and the network repository function network element is not specifically limited.

Figure 2B:
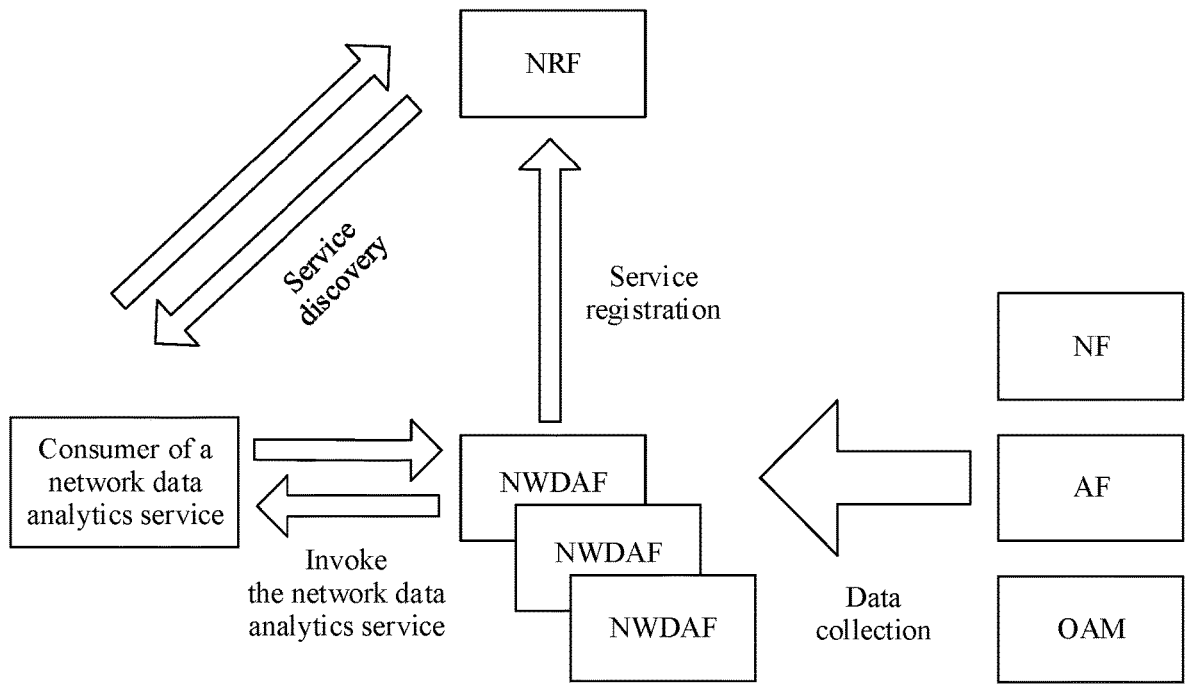
FIG. 2B is a schematic diagram of a structure of network data analytics system according to an embodiment of this application.

The network data analytics method provided in the embodiments of this application may be applied to the network data analytics system shown in FIG. 2B. The network data analytics system includes an NRF, a plurality of NWDAF instances, a consumer of a network data analytics service (for example, an NF, an AF, or an OAM), a network function network element (for example, a PCF, an AMF, or an SMF), an AF, an OAM, and the like. The NWDAF instance registers the network data analytics service with the NRF. The consumer of the network data analytics service requests the NRF to discover the network data analytics service. The NRF selects an NWDAF instance that meets a requirement as a service discovery result based on registration information of the NWDAF instance. The consumer of the network data analytics service requests the NWDAF instance provided by the NRF to invoke a network data analytics service. After receiving a service request, the NWDAF instance collects and analyzes required data, and then outputs an analytics result to the consumer of the network data analytics service.

Figure 3:
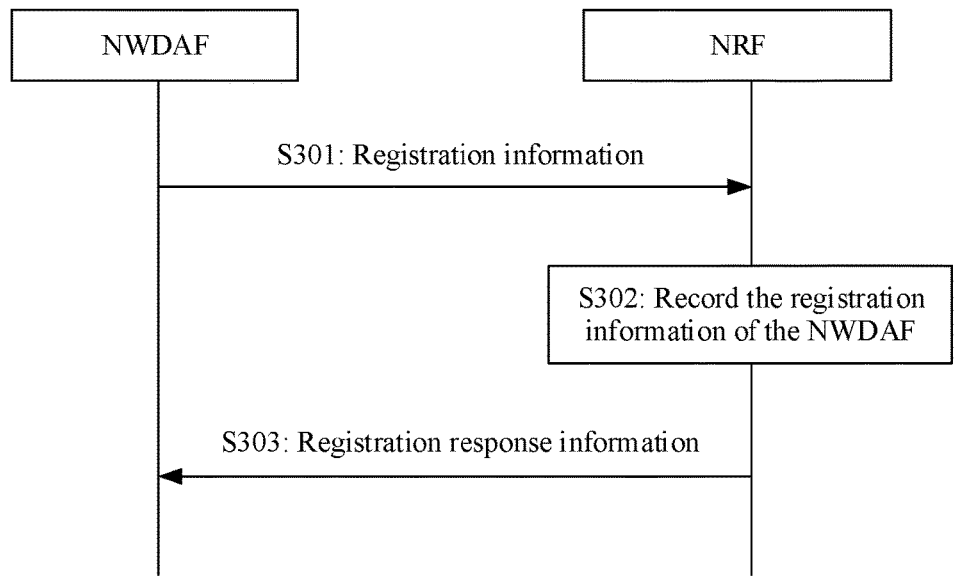
FIG. 3 is a flowchart of a registration method of a network data analytics function network element according to an embodiment of this application.

FIG. 3 is a schematic diagram of a network data analytics function network element registration method in a network data analytics method according to an embodiment of this application.

S301: An NWDAF sends registration information of the NWDAF to an NRF, where the registration information includes one or more analytics identifiers, and an analytics service range of the NWDAF; and NWDAF can provide an analytics service corresponding to the one or more analytics identifiers.

The registration information of the NWDAF may be carried in a registration request message sent by the NWDAF to the NRF.

The analytics service range of the NWDAF (also referred to as a service area of the NWDAF) involves data collection and analytics of the NWDAF, and may be a network range for network data collection, that is, a data collection range. For example, the NWDAF supports to collect network data of user plane functions whose network function identifiers are UPF 1 to UPF 10. For another example, the NWDAF supports to collect experience data of applications deployed at a DNAI 1 and a DNAI 2, and the like. The analytics service range of the NWDAF may also be a network range related to an output network data analytics result, that is, a data analytics range. For example, the NWDAF supports to output network performance analytics in a network range of TAIs 1 to 10. For another example, the NWDAF supports to output experience analytics of applications whose AF IDs are 1 to 5. The foregoing information on the analytics service range of the NWDAF may be used for NWDAF discovery and selection. The analytics service range information of the selected NWDAF can meet a part of analytics filter parameters of a given analytics identifier, in other words, the analytics service range information of the NWDAF can include or match the part of analytics filter parameters carried by a consumer of the analytics service when requesting an analytics service of the given analytics identifier. For example, the NWDAF supports load analytics of 10 user plane function instances from the UPF 1 to the UPF 10. Analytics filtering parameters carried when the consumer of the analytics service requests network function load analytics include a network function instance identifier (for example, the UPF 5 and the UPF 6) and a time period (for example, three hours in the future) for requesting analytics. An analytics filtering parameter range (the UPF 1 to the UPF 10) supported by the NWDAF can meet an analytics filtering parameter (the requested UPF 5 and UPF 6), that is the network function instance identifier corresponding to the network function load analytics. Therefore, the analytics service range of the NWDAF may further be a range of a part of analytics filtering parameters corresponding to an analytics identifier supported by the NWDAF. For example, the analytics filtering parameter corresponding to the network function load analytics includes a network function instance identifier and a time period for requesting analytics. The NWDAF uses a parameter range of a supported network function instance identifier as the analytics service range.

For example, the analytics service range includes one or more of the following information: an analytics filtering parameter range corresponding to one or more analytics identifiers in analytics identifiers provided by the network data analytics function network element, a data collection range, and a data analytics range.

In this embodiment of this application, the analytics filtering parameter may be some parameter types or values that can be used to select an analytics result of a requested analytics identifier, and a part of subsets of all analytics results corresponding to an analytics identifier supported by the NWDAF may be filtered out by using the analytics filtering parameter. For example, based on a specific analytics identifier (such as service experience analytics, the network function load analytics, the network performance analytics, terminal communication analytics, and terminal mobility analytics), the following describes the analytics filtering parameter. For example, for the service experience analytics, the analytics filtering parameter may include but is not limited to: a tracking area identity (tracking area identity, TAI), a data network name (data network name, DNN), a data network access identifier (data network access identifier, DNAI), an application identifier, and the like. For example, an NWDAF provides a service experience analytics service, and an analytics filtering parameter corresponding to the service experience analytics includes TAIs 1 to 7 (that is, the NWDAF may provide service experience analytics services for the TAIs 1 to 7), a DNN 1 (that is, the NWDAF may provide a service experience analytics service for the DNN 1), an application identifier 1 (that is, the NWDAF may provide a service experience analytics service for an application corresponding to an application identifier 1), and the like. For the network function load analytics, the analytics filtering parameter may, but is not limited to, a network function instance identifier. For the network performance analytics, the analytics filtering parameter may include, but is not limited to, a TAI, a DNN, a network slice identifier, an application identifier, and an internal user group identifier. For the terminal communication analytics, the analytics filtering parameter may include, but is not limited to, an application identifier and an internal user group identifier. For the terminal mobility analytics, the analytics filtering parameter may include, but is not limited to, a TAI and an internal user group identifier.

The data collection range may be understood as a network range for collecting network data, and the network range may be a track area (track area, TA) or a TA list. Alternatively, the network range may refer to a list of one or more network function instances. Alternatively, the network range may be a list of one or more application functions that allow data collection or a list of application identifiers application IDs of these application functions. Alternatively, the network range may refer to a network domain (for example, a network domain divided for management purposes). Alternatively, the network range may also refer to an administrative region (for example, a country, a province, or a city). Alternatively, the network range may refer to a geographical location area (for example, a longitude and latitude range).

The data analytics range may be understood as a network range related to a network data analytics result provided by the NWDAF, where the network range may refer to a TA or a TA list. Alternatively, the network range may refer to a list of one or more network function instances. Alternatively, the network range may be a list of one or more application functions that allow data collection or a list of application identifiers application IDs of these application functions. Alternatively, the network range may refer to a network domain (for example, a network domain divided for management purposes). Alternatively, the network range may also refer to an administrative region (for example, a country, a province, or a city). Alternatively, the network range may refer to a geographical location area (for example, a longitude and latitude range).

In specific implementation, the analytics service range may be carried in an NF profile of the NWDAF. To be specific, the registration request message may carry an identifier group including analytics identifiers respectively corresponding to one or more analytics identifiers provided by the network data analytics function network element, and configuration information (NF Profile) of the network data analytics function network element. The NF profile includes the analytics service range.

The data collection range may be equal to or less than the data analytics range. For example, the data analytics range is a first network range, and the data collection range may be the first network range, or the data collection range may be a subset of the first network range.

S302: The NRF records the registration information of the NWDAF.

During specific implementation, if an analytics service range is carried in an NF profile, the NRF may further support to parse an NF profile used when an NWDAF instance is registered, to determine an analytics service range supported by the NWDAF instance.

S303: The NRF sends a registration response message to the NWDAF.

For better understanding of a registration procedure provided in this embodiment of this application, the following describes a registration procedure of the NWDAF in detail with reference to a specific scenario. It is assumed that an NWDAF instance 1 supports to provide an analytics service in an entire PLMN range based on preconfiguration after being started. An NWDAF instance 2 supports to provide an analytics service only in a part of a service range based on preconfiguration after being started. An NWDAF instance 3 supports to provide an analytics service only in a part of a service range, and a network function configuration profile NF profile of the NWDAF instance 3 includes the service range supported by the NWDAF instance 3.

Figure 4:
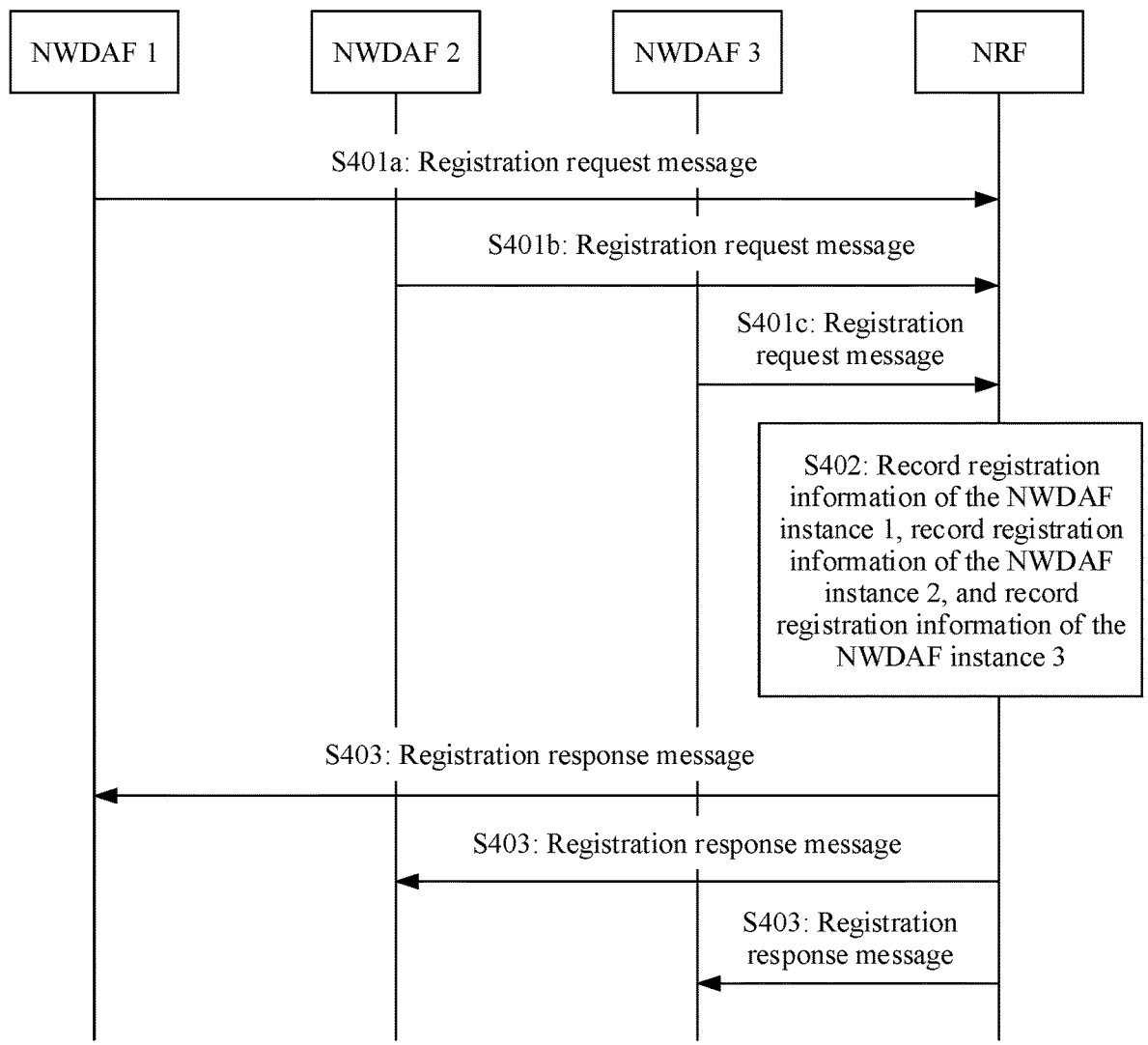
FIG. 4 is a schematic diagram of an NWDAF registration process according to an embodiment of this application.

As shown in FIG. 4, a registration process of an NWDAF includes the following steps.

S401a: An NWDAF instance 1 sends a registration request message to an NRF, where the registration request message carries an instance identifier of the NWDAF instance 1 and an analytics ID corresponding to a supported analytics identifier, and the registration request message may not carry an analytics service range parameter, to indicate to support to provide an analytics service in an entire PLMN range.

In this embodiment of this application, the registration request message may be named as an Nnrf_NFManagement_NFRegister message. Certainly, in an actual application, the registration request message may also be named as another message. This is not specifically limited herein.

S401b: An NWDAF instance 2 sends a registration request message to the NRF, where the registration request message carries an instance identifier of the NWDAF instance 2, an analytics ID corresponding to a supported analytics identifier, and a to-be supported analytics service range.

The supported analytics service range may include an analytics filtering parameter range corresponding to the analytics ID supported by the NWDAF instance 2. For example, a range of a filtering parameter, that is, a network function instance identifier corresponding to network function load analytics supported by the NWDAF instance 2 is a UPF 1 to a UPF 10. For another example, a range of a filtering parameter, that is, an internal group ID (Internal Group ID) corresponding to network performance analytics supported by the NWDAF instance 2 is group 6. The supported analytics service range may further include a network range (namely, a data analytics range) that provides a data analytics service supported by the NWDAF instance 2, for example, a TA or a TA list, a network function instance or a network function instance list, an application function or an application function list, an application identifier or an application identifier list, a network domain (for example, a network domain divided for management purposes), an administrative region, or a geographical location area. The analytics service range may further include a network range of data collection (namely, a data collection range) supported by the NWDAF instance 2, for example, a TA or a TA list, a network function instance or a network function instance list, an application function or an application function list, an application identifier or an application identifier list, a network domain (for example, a network domain divided for management purposes), an administrative region, or a geographical location area.

In a possible implementation, the analytics service range supported by the NWDAF instance 2 may be carried in an NF profile of the NWDAF instance 2. To be specific, the registration request message sent by the NWDAF instance 2 carries the instance identifier of the NWDAF instance 2, the analytics ID corresponding to the supported analytics identifier, and the NF profile of the NWDAF instance 2. The NF profile of the NWDAF instance 2 includes the analytics service range supported by the NWDAF instance 2.

S401c: An NWDAF instance 3 sends a registration request message to the NRF, where the registration request message carries an instance identifier of the NWDAF instance 3, an analytics ID corresponding to a supported analytics identifier, and a to-be supported analytics service range.

In a possible implementation, an analytics service range supported by the NWDAF instance 3 may be carried in an NF profile of the NWDAF instance 3. To be specific, the registration request message sent by the NWDAF instance 3 carries the instance identifier of the NWDAF instance 3, the analytics ID corresponding to the supported analytics identifier, and the NF profile of the NWDAF instance 3. The NF profile of the NWDAF instance 3 includes the analytics service range supported by the NWDAF instance 3.

S402: The NRF records registration information of the NWDAF instance 1 (that is, the instance identifier of the NWDAF instance 1 and the analytics ID corresponding to the supported analytics identifier), records registration information of NWDAF instance 2 (that is, the instance identifier of the NWDAF instance 2, the analytics ID corresponding to the supported analytics identifier, and the supported analytics service range), and records registration information of NWDAF instance 3 (that is, the instance identifier of the NWDAF instance 3, the analytics ID corresponding to the supported analytics identifier, and the supported analytics service range).

Specifically, if the analytics service range supported by the NWDAF instance 2 may be carried in the NF profile of the NWDAF instance 2, that is, the registration request carries the instance identifier of the NWDAF instance 2, the analytics ID corresponding to the supported analytics identifier, and the NF profile of the NWDAF instance 2, the NRF parses the NF profile of the NWDAF instance 2, obtains the analytics service range supported by the NWDAF instance 2, and then records the registration information of the NWDAF instance 2 (that is, the instance identifier of the NWDAF instance 2, the analytics ID corresponding to the supported analytics identifier, and the supported analytics service range).

During specific implementation, the analytics ID may also be included in the NF profile. This is not specifically limited herein.

Similarly, if the analytics service range supported by the NWDAF instance 3 may be carried in the NF profile of the NWDAF instance 3, that is, the registration request carries the instance identifier of the NWDAF instance 3, the analytics ID corresponding to the supported analytics identifier, and the NF profile of the NWDAF instance 3, the NRF parses the NF profile of the NWDAF instance 3, obtains the analytics service range supported by the NWDAF instance 3, and then records the registration information of the NWDAF instance 3 (that is, the instance identifier of the NWDAF instance 3, the analytics ID corresponding to the supported analytics identifier, and the supported analytics service range).

S403: The NRF separately sends registration response messages to the NWDAF instance 1, the NWDAF instance 2, and the NWDAF instance 3.

It should be understood that FIG. 4 is merely an example, and does not specifically limit a quantity of NWDAF instances, a supported analytics service range, a name of a message, a name of a network element, and the like.

Figure 5:
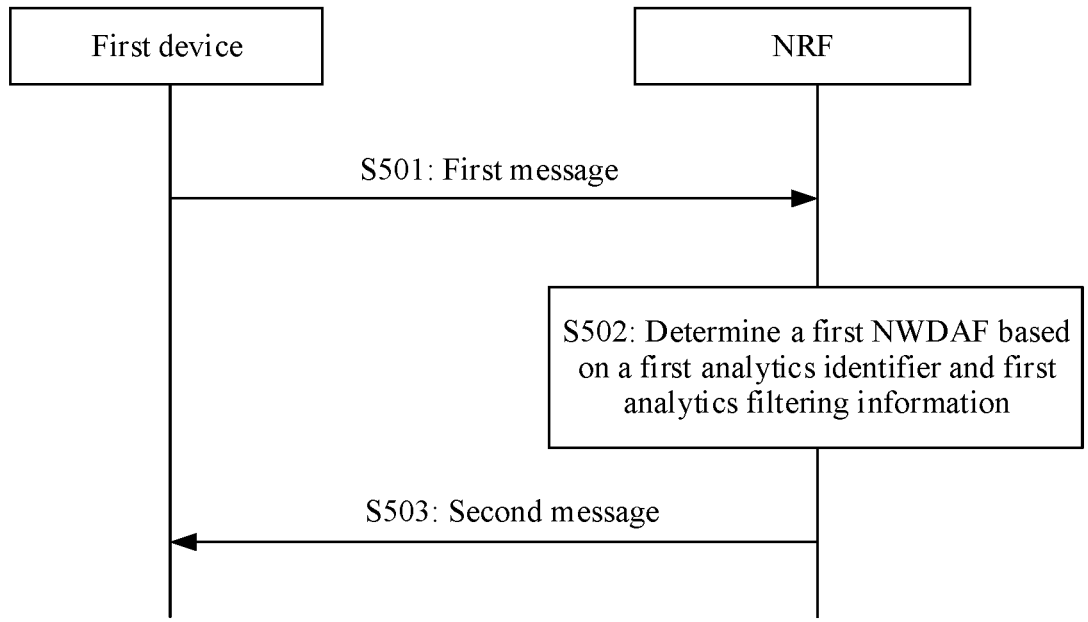
FIG. 5 is a schematic diagram of a procedure of an NWDAF discovery method according to an embodiment of this application.

FIG. 5 is a schematic diagram of an NWDAF discovery method in a network data analytics method according to an embodiment of this application.

S501: A first device sends a first message to an NRF, where the first message is used to request to discover an NWDAF. The first message carries a first analytics identifier and first analytics filtering information. Correspondingly, the NRF receives the first message sent by the first device.

The first analytics filtering information may be a part of analytics filtering information requested by the first device. For example, the first device expects to discover and select, by using the NRF, an NWDAF instance that can provide network function load analytics, and analytics filtering information that needs to be carried for requesting the network function load analytics includes two parameters: a network function instance identifier and a time period for requesting analytics. The first device uses the network function instance identifier parameter as the first analytics filtering information.

During specific implementation, the first message may carry a network function type of a network function instance requested to be discovered (in this embodiment of this application, the first message requests discovery of an NWDAF, therefore, the network function type of the network function instance requested to be discovered by the first message is the NWDAF), an analytics identifier (namely, an analytics ID) of an expected network data analytics service, and an expected analytics service range.

For example, the first message may be named as an Nnrf_NFDiscovery_Request message. Certainly, the first message may also be named as another message. This is not specifically limited herein.

The first device is a consumer of a network data analytics service, for example, an NF, an AF, or an OAM, and is not enumerated herein.

S502: The NRF determines a first NWDAF based on the first analytics identifier and the first analytics filtering information, where the first NWDAF can provide an analytics service corresponding to the first analytics identifier, and an analytics service range of the first NWDAF meets the first analytics filtering information.

For example, the analytics service range may include one or more of the following information: an analytics filtering parameter range, a data collection range, and a data analytics range.

During specific implementation, step S502 may be implemented in the following manner: The NRF may obtain registration information of a plurality of NWDAFs, where the registration information includes one or more analytics identifiers, and an analytics service range of an NWDAF. The NWDAF can provide an analytics service corresponding to the one or more analytics identifiers. The first NWDAF is determined in the plurality of NWDAFs based on the first analytics identifier, the first analytics filtering information, and the registration information of the plurality of NWDAFs, where one or more analytics identifiers in registration information of the first NWDAF include the first analytics identifier, and an analytics service range in the registration information of the first NWDAF includes the first analytics filtering information.

For example, when the first analytics filtering information is TAIs 1 to 5, the analytics filtering parameter range supported by the first NWDAF may be 1 to 10. For another example, when the first analytics filtering information includes an AF ID 2 and an AF ID 3, the data collection range of the first NWDAF may be AF IDs 1 to 5. In other words, the analytics service range of the first NWDAF includes the first analytics filtering information. For example, when the first analytics filtering information is UPFs 1 to 10, the analytics filtering parameter range supported by the first NWDAF may be the UPFs 1 to 10. In other words, the analytics service range of the first NWDAF may match the first analytics filtering information.

The NRF may specifically obtain the registration information of the plurality of NWDAFs by using the registration procedures shown in FIG. 3 and FIG. 4. For the registration information of the NWDAF, refer to related description of the registration information in the registration procedures in FIG. 3 and FIG. 4. Details are not described herein again.

In a possible implementation, when the NRF determines the first NWDAF in the plurality of NWDAFs based on the first analytics identifier, the first analytics filtering information, and the registration information of the plurality of NWDAFs, the following manner may be used: The NRF may query registration information of all NWDAF instances based on a network function type, and search for an NWDAF instance whose analytics identifier and a supported analytics service range can meet a requirement of the first message.

Specifically, the NRF may query, based on the registration information of all NWDAF instances, an NWDAF instance supporting a first analytics ID, and query, and search the first NWDAF instance supporting the first analytics filtering information based on an analytics service range supported by the NWDAF instance supporting the first analytics ID.

During specific implementation, if there are a plurality of NWDAF instances that meet the requirement of the first message, the NRF may determine one NWDAF instance in the plurality of NWDAF instances that meet the requirement of the first message as a result of service discovery query, for example, the NRF may select an NWDAF instance as the result of service discovery query based on a load balancing requirement.

During specific implementation, if there is no NWDAF instance that can meet the requirement of the first message, the NRF may select an NWDAF instance closest to the requirement of the first message as a result of service discovery query (that is, as the first NWDAF), for example, the NRF may select, from NWDAF instances supporting the first analytics ID, an NWDAF instance whose supported analytics service range is closest to the first analytics filtering information, as the result of service discovery query.

S503: The NRF sends a second message to the first device, where the second message carries a service access address of the first NWDAF. Therefore, subsequently, the consumer of the network data analytics service (namely, the first device) may invoke, by using the service access address, a network data analytics service provided by an NWDAF instance.

For example, the second message may be named as an Nnrf_NFDiscovery_Response message. Certainly, the second message may also be named as another message. This is not specifically limited herein.

In this embodiment of this application, the NWDAF that meets the requirement of the first message is determined by matching the analytics service range requested by the first message and an analytics service range supported by each NWDAF. This ensures that an NWDAF instance selected through a service discovery process can support data collection and analytics services in a requested network range.

Figure 6:
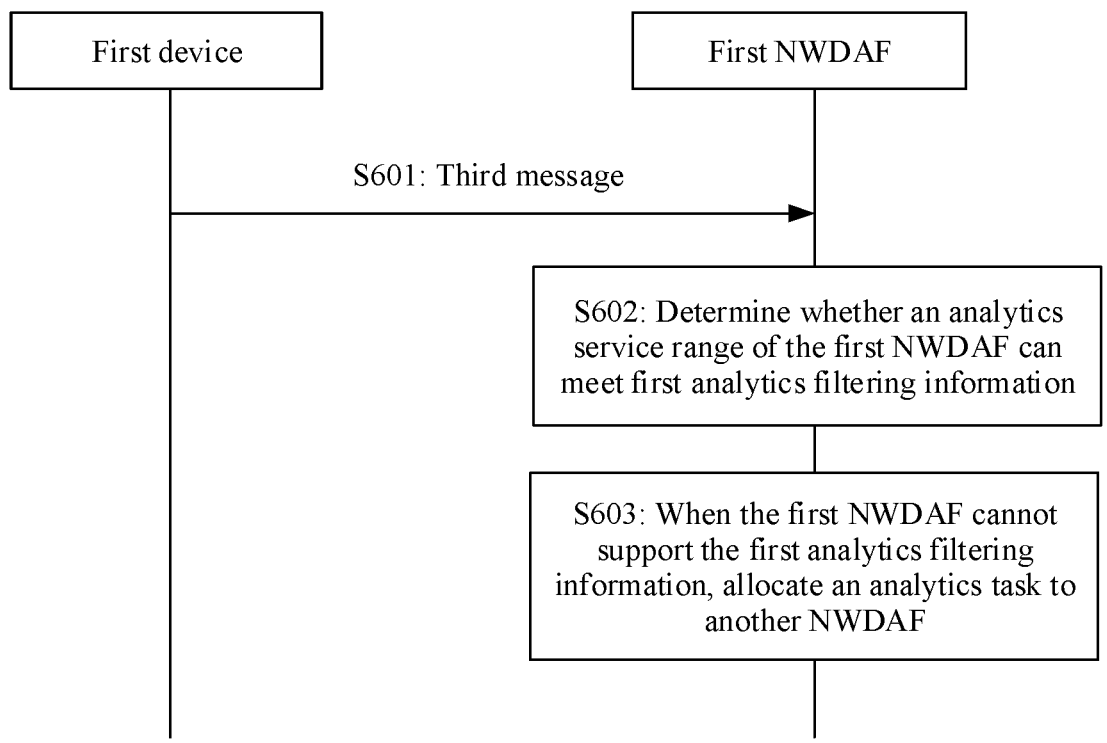
FIG. 6 is a flowchart of a network data analytics method according to an embodiment of this application.

FIG. 6 is a schematic diagram of a network data analytics method in a network data analytics method according to an embodiment of this application.

S601: A first device sends a third message to a first NWDAF, where the third message is used to request an analytics service. The third message carries first analytics filtering information. In addition, the third message may further carry one or more requested analytics IDs. Correspondingly, the first NWDAF receives an analytics service request sent by the first device.

For example, the third message may be an analytics service request message. Certainly, the third message may also be named as another message. This is not specifically limited herein.

S602: The first NWDAF determines whether an analytics service range of the first NWDAF can meet the first analytics filtering information.

S603: When the first NWDAF cannot support the first analytics filtering information, the first NWDAF allocates an analytics task to another NWDAF.

In some embodiments, the first NWDAF may determine, based on the first analytics filtering information and recorded analytics service ranges of a plurality of NWDAFs, whether a second NWDAF supporting the first analytics filtering information exists in the plurality of NWDAFs.

Further, if the second NWDAF exists, the first NWDAF sends a fourth message to the second NWDAF, where the fourth message is used to request the analytics service, and the fourth message carries an address of the first device. Therefore, the second NWDAF may send a data analytics result to the first device based on the address of the first device.

For example, the fourth message may be an analytics service response message. Certainly, the fourth message may also be named as another message. This is not specifically limited herein.

If no NWDAF supporting the first analytics service range exists, the first NWDAF determines, based on the first analytics filtering information and recorded analytics service ranges of a plurality of NWDAFs, one or more second NWDAFs in the plurality of NWDAFs. For any second NWDAF in the one or more second NWDAFs, the first NWDAF decomposes, based on an analytics service range of the second NWDAF, the analytics service requested by the first device into one subtask, and allocates the subtask to the second NWDAF.

In a specific implementation, that the first NWDAF may determine, based on the first analytics filtering information and the recorded analytics service ranges of the plurality of NWDAFs, the one or more second NWDAFs in the plurality of NWDAFs may be specifically implemented in the following manner:

S1: The first NWDAF determines a data analytics range based on the first analytics filtering information.

S2: The first NWDAF divides the data analytics range into one or more data collection subranges based on the recorded analytics service ranges of the plurality of NWDAFs. For example, specifically, the first NWDAF may determine, based on a requested data analytics range, which network data needs to be collected from which network functions (NFs), which application service data is collected from which application functions (AFs), or which network key performance indicator or the like is collected from an OAM by a requested analytics service type, and then determine the data collection subrange based on the foregoing network functions, the application functions, or the OAM.

S3: The first NWDAF determines the one or more second NWDAFs based on the one or more data collection subranges, where an analytics service range of one second NWDAF includes one data collection subrange.

Further, that the first NWDAF decomposes, based on the analytics service range of the second NWDAF, the analytics service requested by the first device into one subtask may be implemented in the following manner: The first NWDAF decomposes, for the second NWDAF, the analytics service requested by the first device into one subtask, where the subtask is a data collection task or a data analytics task in a data collection subrange included in the analytics service range of the second NWDAF.

In an example, the subtask may be a data collection task. Therefore, the one or more second NWDAFs separately collect network data corresponding to a corresponding subtask requirement, and send the collected network data to the first NWDAF. Correspondingly, the first NWDAF receives the network data separately sent by the one or more second NWDAFs, and network data sent by any second NWDAF is obtained through collection by the second NWDAF for allocated subtask. The first NWDAF performs data analytics based on first data, to obtain a data analytics result, and sends the data analytics result to the first device, where the first data includes the network data separately sent by the one or more second NWDAFs.

In another example, the subtask may be a data analytics task. Therefore, the one or more second NWDAFs separately collect network data corresponding to a corresponding subtask requirement, and perform data analytics on the network data, to obtain a data analytics result. The one or more second NWDAFs separately send obtained data analytics results to the first NWDAF. The first NWDAF receives the data analytics results separately sent by one or more second NWDAFs, where a data analytics result sent by any second NWDAF is obtained through data collection and data analytics by the second NWDAF for the allocated subtask. The first NWDAF summarizes the data analytics results separately sent by the one or more second NWDAFs, to obtain a summarized data analytics result, and sends the summarized data analytics result to the first device, or sends the data analytics result to the first device after further analyzing and processing the summarized data analytics result.

Recorded analytics service ranges of a plurality of NWDAFs may be obtained in the following manner:

A1: The first NWDAF sends a fifth message to the NRF, where the fifth message is used to request to discover an NWDAF, and the fifth message carries one or more analytics IDs.

A2: The NRF queries the plurality of NWDAFs based on recorded registration information of the plurality of NWDAFs. An NWDAF obtained through querying supports one or more of analytics IDs carried in the fifth message.

A3: The NRF sends a sixth message to the first NWDAF, where the sixth message carries service access addresses of the plurality of NWDAFs and corresponding analytics service ranges. Correspondingly, the first NWDAF receives the sixth message from the NRF.

A4: The first NWDAF records the analytics service ranges of the plurality of NWDAFs.

In addition, the fifth message may further carry indication information, and the indication information is used to request to obtain configuration information of an NWDAF. Therefore, the sixth message sent by the NRF to the first NWDAF may further carry configuration information of the plurality of NWDAFs, and the configuration information includes analytics service ranges. Further, the first NWDAF may obtain and record the analytics service range of the NWDAF by parsing the configuration information of the NWDAF.

To better understand the network data analytics procedure provided in this embodiment of this application, the following specifically describes the network data analytics procedure in detail with reference to a specific scenario.

Figure 7A:
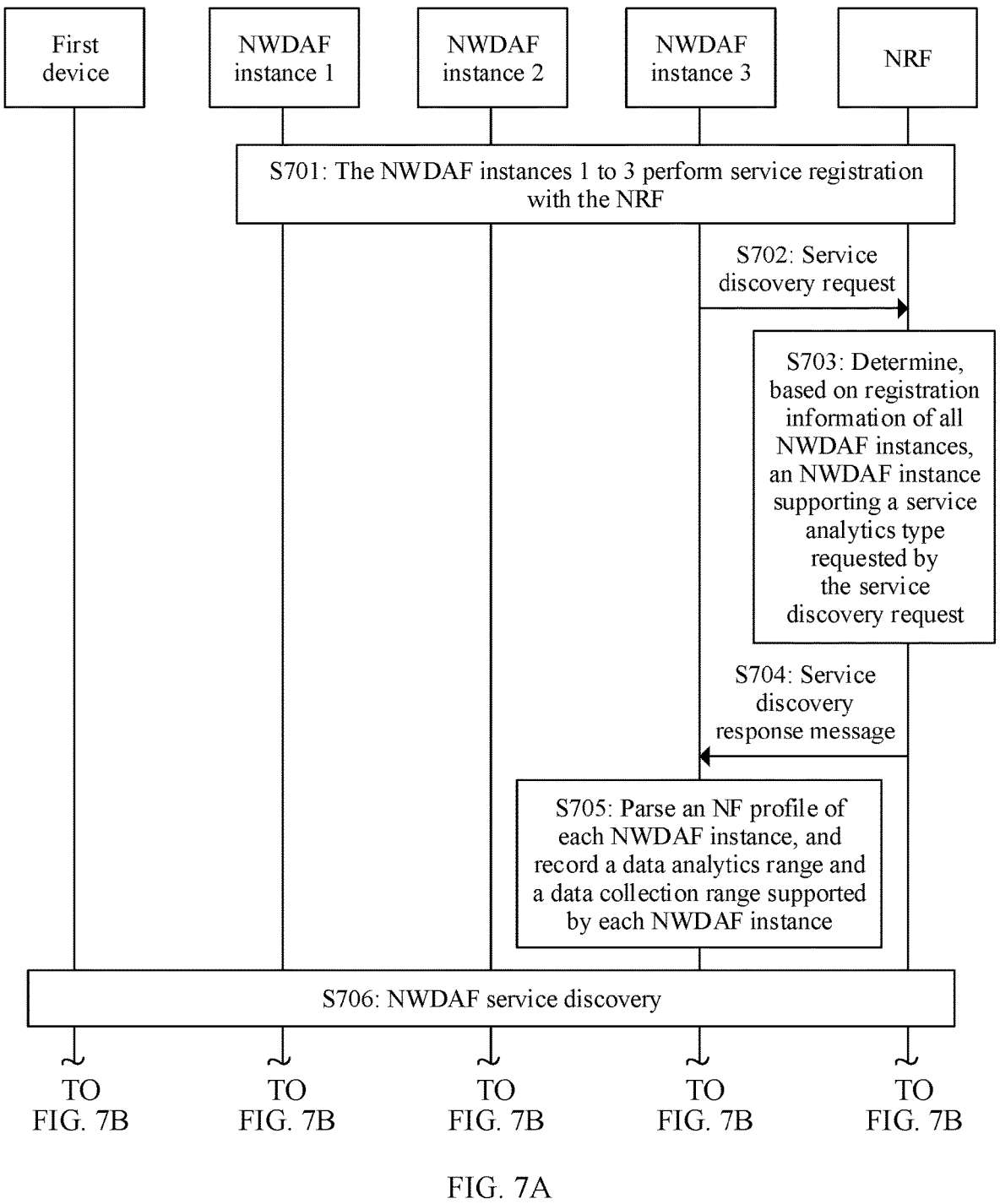
FIG. 7A and FIG. 7B are a schematic diagram of a network data analytics process according to an embodiment of this application.
Figure 7B:
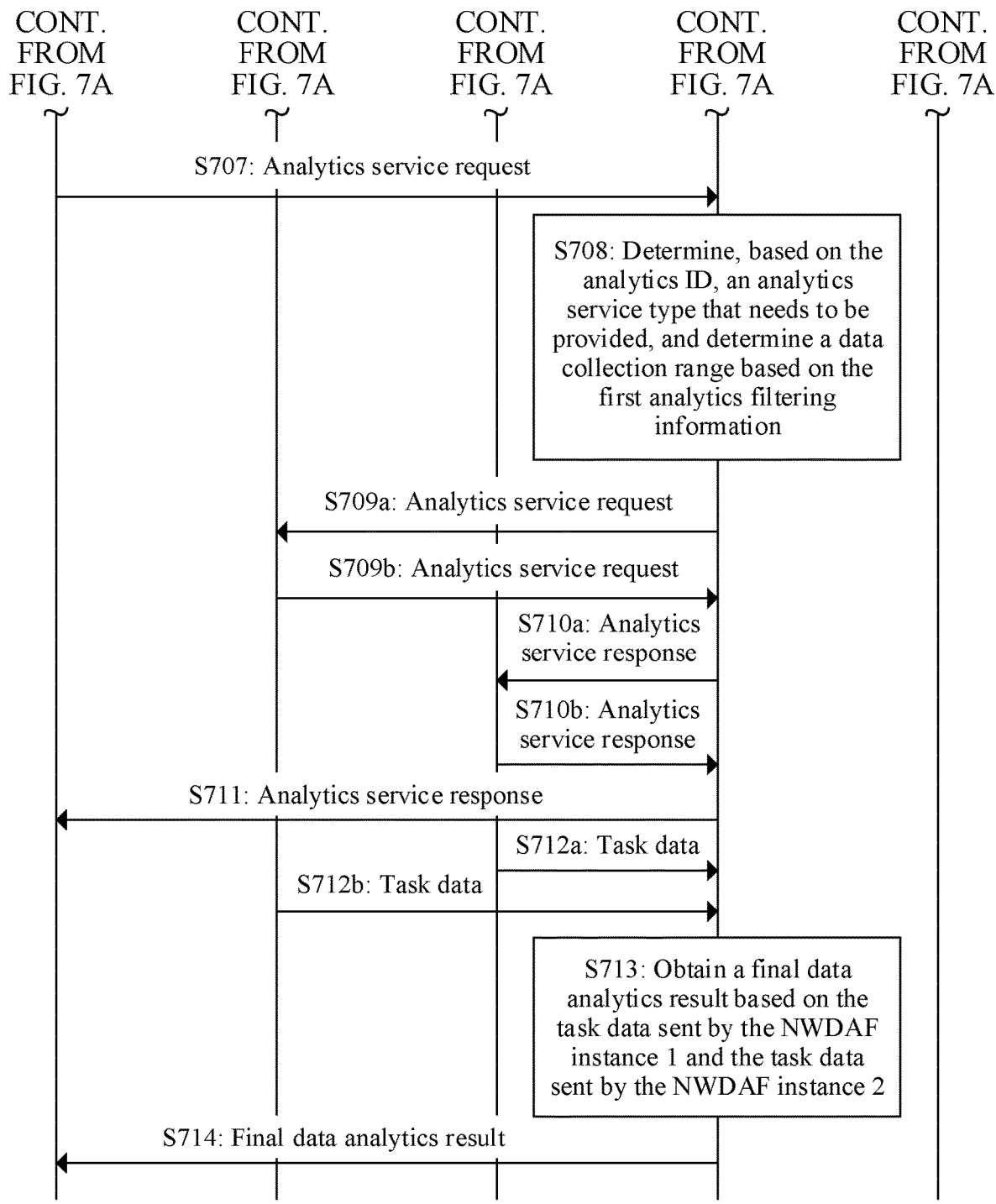

As shown in FIG. 7A and FIG. 7B, a network data analytics process includes the following steps.

It is assumed that an NWDAF instance 3 can provide some type of analytics service in an entire PLMN range (that is, a data analytics range of the NWDAF instance 3 is the entire PLMN), but does not support to collect data from an NF, an AF, or an OAM (that is, a data collection range of the NWDAF instance 3 is empty). An NWDAF instance 1 and an NWDAF instance 2 provide this type of analytics service in two different network domains and support data collection in their respective network domains.

S701: The NWDAF instances 1 to 3 perform service registration with an NRF. For a specific process, refer to FIG. 3 or FIG. 4. Details are not described herein again.

S702: The NWDAF instance 3 sends a service discovery request to the NRF (the service discovery request may correspond to the fifth message in step A1), where the service discovery request carries one or more analytics IDs, and specifically, the service discovery request may carry one or several analytics IDs, or all analytics IDs supported by the NWDAF instance 3.

In addition, the service discovery request may further carry indication information for requesting to obtain an NF profile.

S703: The NRF determines, based on registration information of all NWDAF instances, an NWDAF instance supporting a service analytics type requested by the service discovery request.

S704: The NRF sends a service discovery response message to the NWDAF instance 3 (the service discovery response message may correspond to the sixth message in step A3). The service discovery response message carries service access addresses and corresponding NF profiles of all NWDAF instances supporting the service analytics type requested by the service discovery request.

S705: The NWDAF instance 3 parses an NF profile of each NWDAF instance, and records a data analytics range and a data collection range supported by each NWDAF instance.

S706: NWDAF service discovery. For a specific process, refer to FIG. 5. Details are not described herein again. It is assumed that the NRF obtains, by querying, that the NWDAF instance 3 provides a first analytics identifier in the entire PLMN range, and the NRF returns a service access address of the NWDAF instance 3 to a first device.

S707: The first device sends an analytics service request to the NWDAF instance 3 (the analytics service request may correspond to the third message in step S601). The analytics service request is used to request an analytics service. Correspondingly, the analytics service request carries first analytics filtering information. The first analytics filtering information may be a network range related to a network data analytics result that the first device expects an NWDAF to provide, that is, a data analytics range. The first analytics filtering information may also be an analytics filtering parameter range used by the first device to filter out a part of subsets of analytics results of a requested analytics service type, that is, an analytics filtering parameter range. In addition, the analytics service request may carry one or more analytics IDs of the request. Correspondingly, a first NWDAF receives the analytics service request sent by the first device.

S708: After receiving the analytics service request, the NWDAF instance 3 determines, based on the analytics ID, an analytics service type that needs to be provided, and determines a data collection range based on the first analytics filtering information. Specifically, the NWDAF 3 may determine, based on a requested data analytics range, which network data needs to be collected from which network functions, which application service data is collected from which application functions, or which network key performance indicator or the like is collected from the OAM by the analytics service type, and then determine the data collection based on the foregoing network functions, the application functions, or the OAM. The NWDAF instance 3 may further determine, based on an analytics filtering parameter carried in the analytics service request, the analytics service type needs to collect data of which location areas, cells, network function instances, application functions, or applications, that is, determine the data collection range from an analytics filtering parameter range that needs to be supported. Because the NWDAF instance 3 itself cannot directly collect data, a data collection task is decomposed based on the first analytics filtering information.

For example, the NWDAF instance 3 divides, based on the analytics service type supported by each NWDAF instance recorded in step S705, a data analytics range (which may be determined based on the first analytics filtering information) requested by the first device into a data collection task in a network domain 1 and a data collection task in a network domain 2. Based on the data collection range supported by each NWDAF instance recorded in step S705, the NWDAF instance 3 allocates the data collection task in the network domain 1 to the NWDAF instance 1, and allocates the data collection task in the network domain 2 to the NWDAF instance 2.

After receiving the analytics service request, the NWDAF instance 3 determines, based on the analytics ID, the analytics service type that needs to be provided and the data analytics range (which may be determined based on the first analytics filtering information), determines that the NWDAF instance 3 does not support the requested data analytics range, divides, based on the analytics service type supported by each NWDAF instance recorded in step S705, the data analytics range requested by the first device into a data analytics task in the network domain 1 and a data analytics task in the network domain 2. Based on the data analytics range supported by each NWDAF instance recorded in step S705, the NWDAF instance 3 allocates the data analytics task in the network domain 1 to the NWDAF instance 1, and allocates the data analytics task in the network domain 2 to the NWDAF instance 2.

S709a: The NWDAF instance 3 sends the analytics service request to the NWDAF instance 1. The analytics service request is used to request the NWDAF instance 1 to perform network data collection or network data analytics for the network domain 1.

S709b: The NWDAF instance 3 sends the analytics service request to the NWDAF instance 2. The analytics service request is used to request the NWDAF instance 2 to perform network data collection or network data analytics for the network domain 2.

S710a: The NWDAF instance 1 sends an analytics service response to the NWDAF instance 3, where the analytics service response is used to indicate that the analytics service request succeeds.

S710b: The NWDAF instance 2 sends an analytics service response to the NWDAF instance 3, where the analytics service response is used to indicate that the analytics service request succeeds.

During specific implementation, if the NWDAF instance 3 has allocated the data analytics task or the data collection task in the network domain 1 to the NWDAF instance 1, and has allocated the data analytics task or the data collection task in the network domain 2 to the NWDAF instance 2, the NWDAF instance 3 may reuse an existing task, and does not repeatedly allocate a same task to the NWDAF instance 1 and the NWDAF instance 2. In other words, the foregoing steps S709a to S710a and S709b to S710b may not be performed.

S711: The NWDAF instance 3 sends an analytics service response to the first device, where the analytics service response is used to inform the first device of a message that the analytics service request succeeds.

S712a: The NWDAF instance 1 sends task data to the NWDAF instance 3, where if the NWDAF instance 3 allocates a data collection task to the NWDAF instance 1, the task data may be network data collected by the NWDAF instance 1 for the network domain 1. If the NWDAF instance 3 allocates a data analytics task to the NWDAF instance 1, the task data may be a data analytics result obtained after the NWDAF instance 1 collects network data for the network domain 1 and performs network data analytics.

S712b: The NWDAF instance 2 sends task data to the NWDAF instance 3, where if the NWDAF instance 3 allocates a data collection task to the NWDAF instance 2, the task data may be network data collected by the NWDAF instance 2 for the network domain 1. If the NWDAF instance 3 allocates a data analytics task to the NWDAF instance 2, the task data may be a data analytics result obtained after the NWDAF instance 2 collects network data for the network domain 2 and performs network data analytics.

S713: The NWDAF instance 3 obtains a final data analytics result based on the task data sent by the NWDAF instance 1 and the task data sent by the NWDAF instance 2.

Specifically, if the task data is collected network data, the NWDAF instance 3 may summarize the network data collected by the NWDAF instance 1 and the network data collected by the NWDAF instance 2, and perform data analytics on the summarized network data, to obtain the final data analytics result.

If the task data is data analytics data, the NWDAF instance 3 may summarize data analytics data sent by the NWDAF instance 1 and data analytics data sent by the NWDAF instance 2, to obtain the final data analytics result. Alternatively, if the data analytics data sent by the NWDAF instance 1 is correlated to the data analytics data sent by the NWDAF instance 2, the NWDAF instance 3 may further perform data analytics on the summarized data analytics data, to obtain the final data analytics result.

S714: The NWDAF instance 3 sends the final data analytics result to the first device.

In the method shown in FIG. 7A and FIG. 7B, the NWDAF supports the NRF to query an analytics service range supported by another NWDAF instance. The NWDAF may obtain an NF profile of another NWDAF instance from the NRF, so that the NWDAF may query, by parsing, a filtering parameter range in the NF profile of the another NWDAF instance, query, by parsing, a data collection range supported in the NF profile of the another NWDAF instance, and determine an analytics service range supported by the another NWDAF instance. In addition, the NWDAF supports to decompose a data analytics task and/or a data collection task to the another NWDAF instance based on the analytics service range requested by the first device and the analytics service range supported by the another NWDAF, and combine a data analytics result or a data collection result of the another NWDAF instance, to output a final analytics result to the first device. In the foregoing method, by decomposing an analytics task, a plurality of NWDAF instances may be supported to collaborate to complete one analytics service, to ensure that the NWDAF instances can support to provide data collection and analytics services in a requested network range. This reduces data transmission, improves analytics efficiency, and shortens analytics response time.

In addition, the NWDAF instance 3 allocates data analytics tasks to the NWDAF instance 1 and the NWDAF instance 2, so that original network data in the network domain 1 and the network domain 2 is not collected and output outside the network domain (for example, the NWDAF instance 3). Therefore, a network data security requirement can be met.

Figure 8:
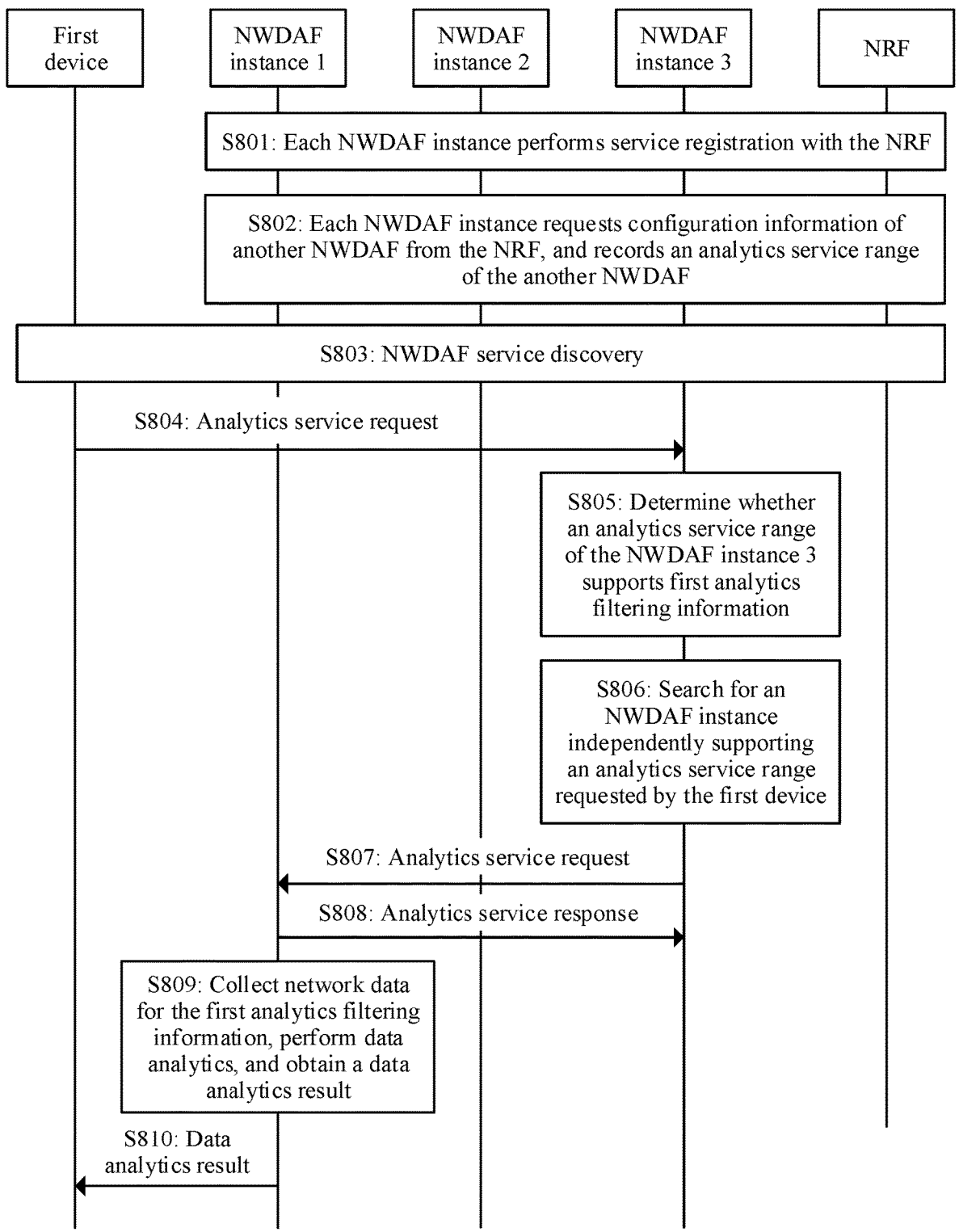
FIG. 8 is a schematic diagram of another network data analytics process according to an embodiment of this application.

As shown in FIG. 8, another network data analytics process includes the following steps.

It is assumed that each NWDAF instance supports a corresponding service range.

S801: Each NWDAF instance performs service registration with an NRF. For a specific process, refer to FIG. 3 or FIG. 4. Details are not described herein again.

S802: Each NWDAF instance requests configuration information of another NWDAF from the NRF, and records an analytics service range of the another NWDAF. For a process in which each NWDAF instance requests configuration information of another NWDAF and records the analytics service range of the another NWDAF, refer to steps S702 to S705 in the method in FIG. 7A. Details are not described herein again.

S803: NWDAF service discovery. For a specific process, refer to FIG. 5. Details are not described herein again. It is assumed that the NRF obtains, by querying, that an NWDAF instance 3 may provide a first analytics identifier, and the NRF returns a service access address of the NWDAF instance 3 to a first device.

S804: The first device sends an analytics service request to the NWDAF instance 3. The analytics service request is used to request an analytics service. Correspondingly, the analytics service request carries first analytics filtering information. In addition, the analytics service request may carry one or more analytics IDs of the request. Correspondingly, a first NWDAF receives the analytics service request sent by the first device.

S805: The NWDAF instance 3 determines whether an analytics service range of the NWDAF instance 3 supports the first analytics filtering information. If the analytics service range of the NWDAF instance 3 does not support the first analytics filtering information, step S806 is performed.

If the analytics service range of the NWDAF instance 3 supports the first analytics filtering information, the NWDAF instance 3 collects network data based on the first analytics filtering information, performs data analytics, obtains a data analytics result, and sends the data analytics result to the first device.

Alternatively, if the NWDAF instance 3 supports the first analytics filtering information, for load balancing or other purposes, the NWDAF instance 3 may still select another NWDAF instance and perform subsequent steps.

S806: The NWDAF instance 3 searches the analytics service range of each NWDAF instance obtained in S802, and finds an NWDAF instance supporting the first analytics filtering information, which is assumed as an NWDAF instance 1.

In specific implementation, if no NWDAF instance supporting the first analytics filtering information can be found in step S806, the NWDAF instance 3 may decompose an analytics task by using the method shown in FIG. 6 or FIG. 7A and FIG. 7B, and perform combination processing after receiving an analytics result.

S807: The NWDAF instance 3 forwards the analytics service request to the NWDAF instance 1, where the analytics service request carries an address of the first device.

S808: The NWDAF instance 1 sends an analytics service response to the NWDAF instance 3, where the analytics service response is used to inform the NWDAF instance 3 that the analytics service request succeeds.

S809: The NWDAF instance 1 collects network data for the first analytics filtering information, performs data analytics, and obtains a data analytics result.

S810: The NWDAF instance 1 sends the data analytics result to the first device.

In specific implementation, the NWDAF instance 1 may send the data analytics result to the first device by using an analytics notification message.

In the method shown in FIG. 8, an NWDAF supports the NRF to query an analytics service range supported by another NWDAF instance. The NWDAF may obtain an NF profile of another NWDAF instance from the NRF, so that the NWDAF may query, by parsing, a filtering parameter range in the NF profile of the another NWDAF instance, query, by parsing, a data collection range supported in the NF profile of the another NWDAF instance, and determine an analytics service range supported by the another NWDAF instance. Therefore, an NWDAF instance may support to redirect the analytics service request to an appropriate NWDAF instance based on an analytics service range requested by the first device and an analytics service range supported by another NWDAF instance.

It should be noted that, in the embodiments of this application, the registration method in FIG. 3 or FIG. 4, the NWDAF discovery method in FIG. 5, and the network data analytics methods in FIG. 6 to FIG. 8 may be implemented as an independent solution, or may be implemented as one solution in combination. For example, the registration method described FIG. 3 or FIG. 4 and the NWDAF discovery method shown in FIG. 5 are implemented as one solution in combination. Alternatively, the registration method in FIG. 3 or FIG. 4, and the network data analytics methods in FIG. 6 to FIG. 8 are implemented as a solution in combination. Alternatively, the NWDAF discovery method shown in FIG. 5 and the network data analytics methods shown in FIG. 6 to FIG. 8 are implemented as one solution. Alternatively, the three methods may be implemented as one solution.

Based on a same inventive idea as the method embodiments, an embodiment of this application further provides an apparatus. The apparatus 900 is applied to a network repository function network element. The apparatus 900 may be specifically a processor, a chip, a chip system, a functional module, or the like in the network repository function network element. The apparatus may include a transceiver unit 901 and a processing unit 902. The processing unit 902 is configured to control and manage an action of the apparatus 900. The transceiver unit 901 is configured to perform a receiving action corresponding to S301, the processing unit 902 is configured to perform S302, and the transceiver unit 901 is further configured to perform a sending action in S303. Repeated parts are not described herein again.

In addition, the transceiver unit 901 may be further configured to perform a receiving action corresponding to S501, the processing unit 902 is configured to perform S502, and the transceiver unit 901 is further configured to perform a sending action in S503. Repeated parts are not described herein again.

The processing unit 902 may be further configured to indicate a processing process of the network repository function network element in any of the foregoing embodiments and/or another process of the technical solutions described in this application.

Figure 9:
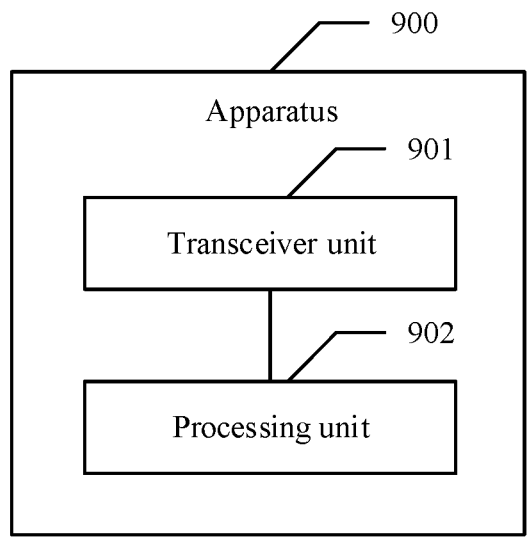
FIG. 9 is a schematic diagram of a structure of an apparatus according to an embodiment of this application.
Figure 10:
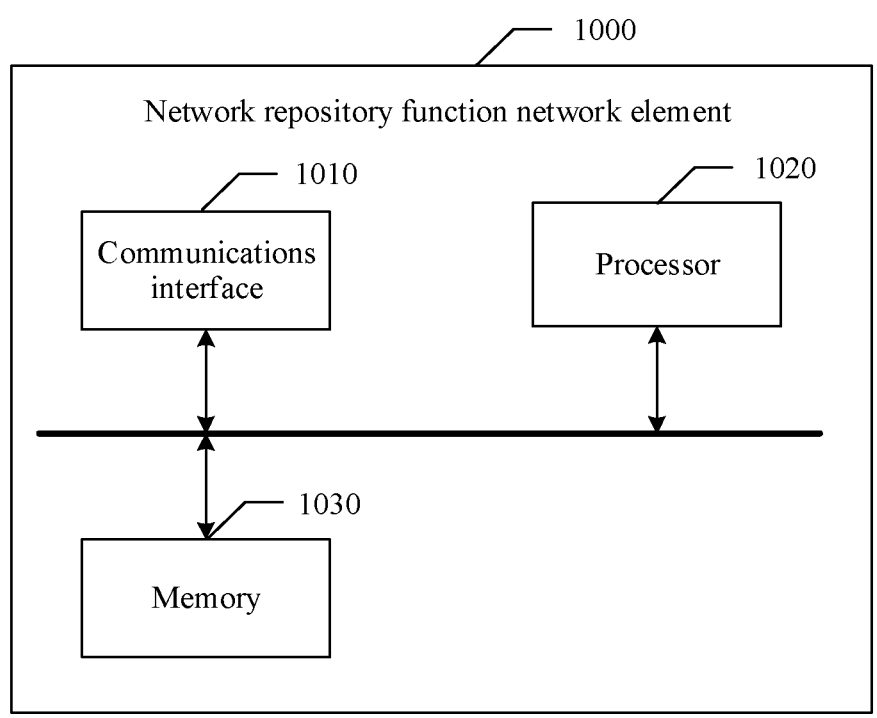
FIG. 10 is a schematic diagram of a structure of a network repository function network element according to an embodiment of this application.

An embodiment of this application further provides a structure of another network repository function network element. As shown in FIG. 10, a network repository function network element 1000 may include a communications interface 1010 and a processor 1020. Optionally, the network repository function network element 100 may further include a memory 1030. The memory 1030 may be disposed inside the network repository function network element, or may be disposed outside the network repository function network element. The processing unit 902 shown in FIG. 9 may be implemented by the processor 1020. The transceiver unit 901 may be implemented by the communications interface 1010. The processor 1020 receives information or a message through the communications interface 1010, and is configured to implement the methods performed by the network repository function network element in FIG. 3 to FIG. 8. In an implementation process, each step of a processing procedure may complete, by using an integrated logic circuit of hardware in the processor 1020 or instructions in a form of software, the methods performed by the network repository function network element in FIG. 3 to FIG. 8.

In this embodiment of this application, the communications interface 1010 may be a circuit, a bus, a transceiver, or any another apparatus that may be configured to perform information exchange. For example, the another apparatus may be a device connected to the network repository function network element 1000. For example, the another apparatus may be a network data analytics function network element.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1020 to implement the foregoing method may be stored in the memory 1030. The memory 1030 is coupled to the processor 1020.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1020 may collaborate with the memory 1030. The memory 1030 may be a non-volatile memory, for example, a hard disk drive (hard disk drive, HDD) or a solid-state disk (solid-state drive, SSD), or may be a volatile memory (volatile memory), for example, a random-access memory (random-access memory, RAM). The memory 1030 is any other medium that can be configured to carry or store expected program code in a form of an instruction or a data structure and that can be accessed by a computer, but is not limited thereto.

In this embodiment of this application, a specific connection medium between the communications interface 1010, the processor 1020, and the memory 1030 is not limited. In this embodiment of this application, the memory 1030, the processor 1020, and the communications interface 1010 are connected through a bus in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

Figure 11:
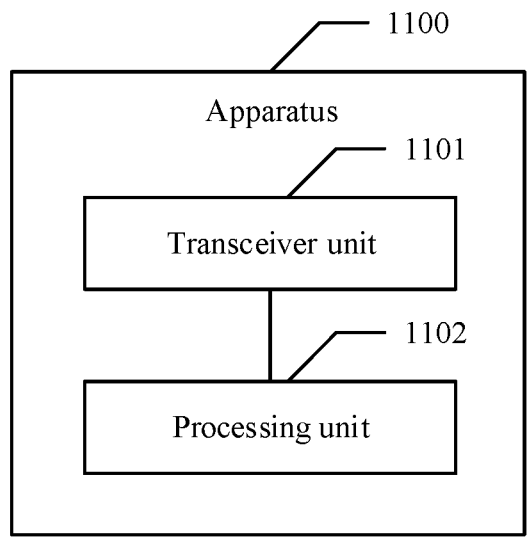
FIG. 11 is a schematic diagram of a structure of another apparatus according to an embodiment of this application.

Based on a same inventive idea as the foregoing method embodiments, an embodiment of this application further provides an apparatus. Refer to FIG. 11. The apparatus 1100 is applied to a network data analytics function network element. The apparatus may be specifically a processor, a chip, a chip system, a functional module, or the like in the network data analytics function network element.

As shown in FIG. 11, the apparatus may include a transceiver unit 1101 and a processing unit 1102. The apparatus may be applied to the network data analytics function network element in the embodiments shown in FIG. 3 to FIG. 4, and in this case, the transceiver unit 1101 is configured to perform a sending action in S301 and a receiving action in S303. The processing unit 1102 may be further configured to perform a processing process related to the network data analytics function network element in the embodiments shown in FIG. 3 to FIG. 4 and/or another process of the technical solutions described in this application.

The apparatus may be applied to the first network data analytics function network element in the embodiments shown in FIG. 6 to FIG. 8. In this case, the transceiver unit 1101 is configured to perform a receiving action in S601, and the processing unit 1102 is configured to perform S602 and S603, or perform a processing process related to the first network data analytics function network element in the embodiments shown in FIG. 6 to FIG. 8 and/or another process of the technical solutions described in this application.

Figure 12:
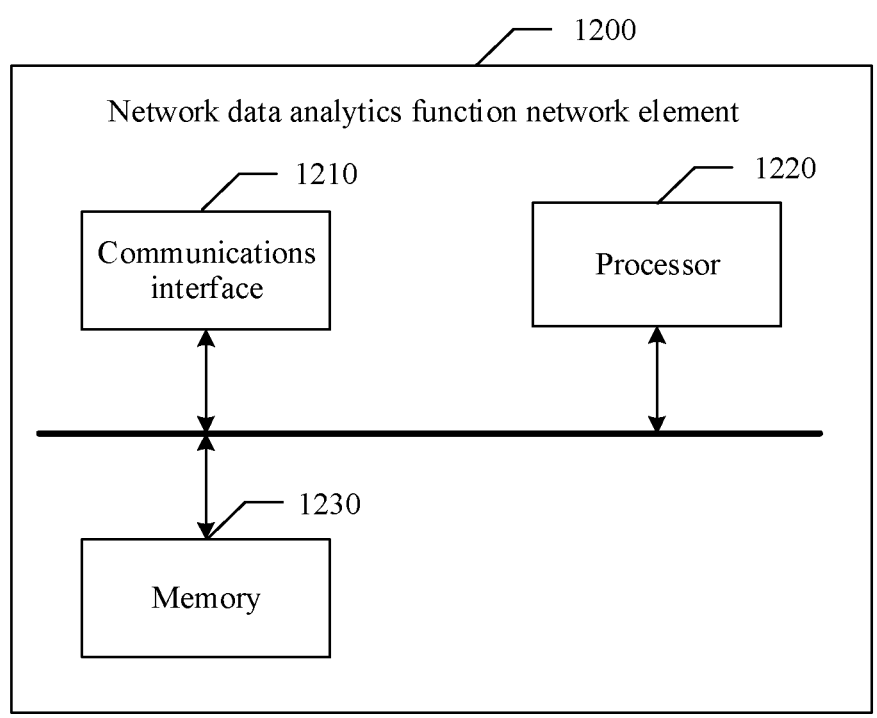
FIG. 12 is a schematic diagram of a structure of a network data analytics function network element according to an embodiment of this application.

An embodiment of this application further provides a structure of another network data analytics function network element. As shown in FIG. 12, the network data analytics function network element 1200 may include a communications interface 1210 and a processor 1220. The network data analytics function network element 1200 may further include a memory 1230. The memory 1230 may be disposed inside the network data analytics function network element, or may be disposed outside the network data analytics function network element. The processing unit 1102 shown in FIG. 11 may be implemented by the processor 1220. The transceiver unit 1101 may be implemented by the communications interface 1210. The processor 1220 receives service data through the communications interface 1210, and is configured to implement the method performed by any network data analytics function network element in FIG. 3 to FIG. 8. In an implementation process, each step of a processing procedure may complete, by using an integrated logic circuit of hardware in the processor 1220 or instructions in a form of software, the methods performed by any network data analytics function network element in FIG. 3 to FIG. 8.

In this embodiment of this application, the communications interface 1210 may be a circuit, a bus, a transceiver, or any another apparatus that may be configured to perform information exchange. For example, the another apparatus may be a device connected to the network data analytics function network element 1200. For example, the another apparatus may be a first device, and a network repository function network element.

In this embodiment of this application, the processor 1220 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1220 to implement the foregoing method may be stored in the memory 1230. The memory 1230 is coupled to the processor 1220. The processor 1220 may collaborate with the memory 1230. The memory 1230 may be a non-volatile memory, for example, a hard disk drive (hard disk drive, HDD) or a solid-state disk (solid-state drive, SSD), or may be a volatile memory (volatile memory), for example, a random-access memory (random-access memory, RAM). The memory 1230 is any other medium that can be configured to carry or store expected program code that has an instruction or a data structure form, and that can be accessed by a computer, but is not limited thereto.

In this embodiment of this application, a specific connection medium between the communications interface 1210, the processor 1220, and the memory 1230 is not limited. In this embodiment of this application, the memory 1230, the processor 1220, and the communications interface 1210 are connected through a bus in FIG. 12, and the bus is represented by a thick line in FIG. 12. A connection manner between other components is schematically described, and is not limited thereto. The bus may be classified into an address bus, a data bus, a control bus, and the like. For ease of representation, only one thick line is used to represent the bus in FIG. 12, but this does not mean that there is only one bus or only one type of bus.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, such as a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process the information or the message in the foregoing methods. Optionally, the chip further includes a memory. The memory is configured to store program instructions and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A network data analytics method, comprising:
receiving, by a first network data analytics function network element, a third message sent by a first device, wherein the third message is used to request an analytics service, and the third message carries first analytics filtering information;
determining, by the first network data analytics function network element, whether an analytics service range of the first network data analytics function network element is capable of meeting the first analytics filtering information; and
when the first network data analytics function network element is incapable of meeting the first analytics filtering information, allocating, by the first network data analytics function network element, an analytics task to another network data analytics function network element.

2. The method according to claim 1, wherein the allocating, by the first network data analytics function network element, the analytics task to another network data analytics function network element comprises:
determining, by the first network data analytics function network element based on the first analytics filtering information and recorded analytics service ranges of a plurality of network data analytics function network elements, whether a second network data analytics function network element that meets the first analytics filtering information exists in the plurality of network data analytics function network elements; and
when the second network data analytics function network element exists, sending, by the first network data analytics function network element, a fourth message to the second network data analytics function network element, wherein the fourth message is used to request an analytics service, and the third message carries an address of the first device.

3. The method according to claim 1, wherein the allocating, by the first network data analytics function network element, the analytics task to another network data analytics function network element comprises:
determining, by the first network data analytics function network element, whether a network data analytics function network element that meets the first analytics filtering information exists;
when no network data analytics function network element that meets the first analytics filtering information exists, determining, by the first network data analytics function network element based on the first analytics filtering information and the recorded analytics service ranges of the plurality of network data analytics function network elements, one or more second network data analytics function network elements in the plurality of network data analytics function network elements;
for any second network data analytics function network element, decomposing, by the first network data analytics function network element based on an analytics service range of the second network data analytics function network element, the analytics service requested by the first device into one subtask; and
allocating, by the first network data analytics function network element, the subtask to the second network data analytics function network element.

4. The method according to claim 3, wherein the subtask is a data analytics task, and the method further comprises:
receiving, by the first network data analytics function network element, data analytics results separately sent by the one or more second network data analytics function network elements, wherein a data analytics result sent by the any second network data analytics function network element is obtained through network data collection and data analytics by the second network data analytics function network element for the allocated subtask;
summarizing, by the first network data analytics function network element, the data analytics results separately sent by the one or more second network data analytics function network elements, to obtain a summarized data analytics result; and
sending, by the first network data analytics function network element, the summarized data analytics result to the first device, or performing data analytics on the summarized data analytics result and sending a processed data analytics result to the first device.

5. The method according to claim 2, wherein the method further comprises:
sending, by the first network data analytics function network element, a fifth message to a network repository function network element, wherein the fifth message is used to request to discover a network data analytics function network element, and the fifth message carries one or more analytics identifiers;
receiving, by the first network data analytics function network element, a sixth message from the network repository function network element, wherein the sixth message carries addresses of the plurality of network data analytics function network elements and corresponding analytics service ranges, and wherein any network data analytics function network element in the plurality of network data analytics function network elements supports an analytics service corresponding to the one or more analytics identifiers; and
recording, by the first network data analytics function network element, the analytics service ranges of the plurality of network data analytics function network elements.

6. The method according to claim 5, wherein the fifth message further carries indication information, and the indication information is used to request configuration information of the network data analytics function network element,
wherein the sixth message carries configuration information of the plurality of network data analytics function network elements, and the configuration information comprises the analytics service ranges, and
wherein the recording, by the first network data analytics function network element, the analytics service ranges of the plurality of network data analytics function network elements comprises:
for any network data analytics function network element in the plurality of network data analytics function network elements, obtaining and recording, by the first network data analytics function network element, an analytics service range of the network data analytics function network element by parsing configuration information of the network data analytics function network element.

7. A network data analytics apparatus, comprising:
a non-transitory memory and at least one processor coupled to the memory, wherein the at least one processor is configured to execute instructions stored in the memory to cause the apparatus to:
send registration information of a network data analytics function network element, wherein the registration information comprises one or more analytics identifiers, and an analytics service range of the network data analytics function network element; and the network data analytics function network element is capable of providing an analytics service corresponding to the one or more analytics identifiers; and
receive a registration response message from a network repository function network element.

8. The network data analytics apparatus according to claim 7, wherein the analytics service range comprises one or more of the following information: an analytics filtering parameter range, a data collection range, and a data analytics range.

9. The network data analytics apparatus according to claim 7, wherein the registration request message carries configuration information of the network data analytics function network element, and the configuration information comprises the analytics service range.

10. A network data analytics apparatus, comprising:
a non-transitory memory and at least one processor coupled to the memory, wherein the at least one processor is configured to execute instructions stored in the memory to cause the apparatus to:
receive a third message sent by a first device, wherein the third message is used to request an analytics service, and the third message carries first analytics filtering information; and
determine whether an analytics service range of the network data analytics apparatus is capable of meeting the first analytics filtering information; and
when the network data analytics apparatus is incapable of meeting the first analytics filtering information, assign an analytics task to another network data analytics function network element.

11. The network data analytics apparatus according to claim 10, wherein when allocating the analytics task to another network data analytics function network element, the at least one processor is further configured to cause the apparatus to:
determine, based on the first analytics filtering information and recorded analytics service ranges of a plurality of network data analytics function network elements, whether a second network data analytics function network element that meets the first analytics filtering information exists in the plurality of network data analytics function network elements; and
when the second network data analytics function network element exists, send a fourth message to the second network data analytics function network element, wherein the fourth message is used to request an analytics service, and the third message carries an address of the first device.

12. The network data analytics apparatus according to claim 10, wherein when allocating the analytics task to another network data analytics function network element, the at least one processor is further configured to cause the apparatus to:

determine whether a network data analytics function network element that meets the first analytics filtering information exists;
when no network data analytics function network element that meets the first analytics filtering information exists, determine, based on the first analytics filtering information and recorded analytics service ranges of a plurality of network data analytics function network elements, one or more second network data analytics function network elements in the plurality of network data analytics function network elements;
for any second network data analytics function network element, decompose, based on an analytics service range of the second network data analytics function network element, the analytics service requested by the first device into one subtask; and
allocate the subtask to the second network data analytics function network element.

13. The network data analytics apparatus according to claim 12, wherein the subtask is a data analytics task, and the at least one processor is further configured to cause the apparatus to
receive data analytics results separately sent by the one or more second network data analytics function network elements, wherein a data analytics result sent by the any second network data analytics function network element is obtained through network data collection and data analytics by the second network data analytics function network element for the allocated subtask;
summarize the data analytics results separately received from the one or more second network data analytics function network elements, to obtain a summarized data analytics result; and
send the summarized data analytics result to the first device, or perform data analytics on the summarized data analytics result and send a processed data analytics result to the first device.

14. The network data analytics apparatus according to claim 11, wherein the at least one processor is further configured to cause the apparatus to:
send a fifth message to a network repository function network element, wherein the fifth message is used to request to discover a network data analytics function network element, and the fifth message carries one or more analytics identifiers;
receive a sixth message from the network repository function network element, wherein the sixth message carries addresses of the plurality of network data analytics function network elements and corresponding analytics service ranges, and wherein any network data analytics function network element in the plurality of network data analytics function network elements supports an analytics service corresponding to the one or more analytics identifiers; and
record the analytics service ranges of the plurality of network data analytics function network elements.

15. The network data analytics apparatus according to claim 14, wherein the fifth message further carries indication information, and the indication information is used to request configuration information of the network data analytics function network element,
wherein the sixth message carries configuration information of the plurality of network data analytics function network elements, and the configuration information comprises the analytics service ranges, and
wherein when recording the analytics service ranges of the plurality of network data analytics function network elements, the at least one processor is further configured to cause the apparatus to:

for any network data analytics function network element in the plurality of network data analytics function network elements, obtain and record an analytics service range of the network data analytics function network element by parsing configuration information of the network data analytics function network element.

16. A communications system, comprising a first device configured to send a third message;

a network data analytics apparatus coupled to the first device and configured to:
- receive a third message sent by a first device, wherein the third message is used to request an analytics service, and the third message carries first analytics filtering information;
- determine whether an analytics service range of the network data analytics apparatus is capable of meeting the first analytics filtering information; and
- when the network data analytics apparatus is incapable of meeting the first analytics filtering information, assign an analytics task to another network data analytics function network element.

\* \* \* \* \*